US012776054B2

(12) United States Patent
Takama

(10) Patent No.: US 12,776,054 B2
(45) Date of Patent: Oct. 27, 2026

(54) INFORMATION PROCESSING APPARATUS FOR OBTAINING THREE-DIMENSIONAL SHAPE DATA

(71) Applicant: CANON KABUSHIKI KAISHA, Tokyo (JP)

(72) Inventor: Yasufumi Takama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 287 days.

(21) Appl. No.: 18/589,467

(22) Filed: Feb. 28, 2024

(65) Prior Publication Data

US 2024/0312039 A1 Sep. 19, 2024

(30) Foreign Application Priority Data

Mar. 14, 2023 (JP) ................................ 2023-039940

(51) Int. Cl.
*G06T 7/593* (2017.01)
*G06T 7/00* (2017.01)
(Continued)

(52) U.S. Cl.
CPC ............ *G06T 7/593* (2017.01); *G06T 7/0002* (2013.01); *G06T 7/521* (2017.01); *H04N 17/002* (2013.01);
(Continued)

(58) Field of Classification Search
CPC ....... G06T 7/593; G06T 7/521; G06T 7/0002; G06T 2207/10012; G06T 2207/10028;
(Continued)

(56) References Cited

U.S. PATENT DOCUMENTS

RE46,108 E * 8/2016 Ohnishi ................. G08C 17/00
10,210,629 B2 * 2/2019 Ohba .................. G06V 10/751
(Continued)

FOREIGN PATENT DOCUMENTS

EP 3321888 A1 * 5/2018 .............. G06F 3/01
JP 2008-015863 A 1/2008
(Continued)

OTHER PUBLICATIONS

Gadasin, D.V. et al. "A Model for Representing the Color and Depth Metric Characteristics of Objects in an Image", Jun. 30, 2021, IEEE (Year: 2021).*
(Continued)

*Primary Examiner* — Edward Park
*Assistant Examiner* — Alejandro Hernandez
(74) *Attorney, Agent, or Firm* — Carter, DeLuca & Farrell LLP

(57) ABSTRACT

The disclosure reduces an object shape estimation error even if an abnormality occurs in a device for obtaining a distance to the object. An information processing apparatus according to the disclosure obtains foreground information indicating regions corresponding to a foreground object in images captured by multiple image capturing devices that capture images of an image capturing region from varying directions, and distance information indicating a distance from a reference point to the foreground object, and obtains three-dimensional shape data indicating a foreground object three-dimensional shape based on the foreground information and the distance information. If the distance information is unobtainable by a first obtaining method, the information processing apparatus obtains the distance information by a second obtaining method, and at least one of the first and second obtaining methods uses at least part of the multiple
(Continued)

image capturing devices as a stereo camera to obtain the distance information.

17 Claims, 12 Drawing Sheets

(51) Int. Cl.
*G06T 7/521* (2017.01)
*H04N 17/00* (2006.01)

(52) U.S. Cl.
CPC ............... *G06T 2207/10012* (2013.01); *G06T 2207/10028* (2013.01)

(58) Field of Classification Search
CPC ........... G06T 2207/30196; G06T 15/20; G06T 15/10; G06T 7/70; G06T 7/11; G06T 11/60; G06T 7/10; G06T 7/194; G06T 7/50; H04N 17/002; H04N 13/271; H04N 13/122; H04N 13/243; H04N 13/282; H04N 2013/0081; H04N 13/111; H04N 13/106; H04N 13/128; H04N 13/10; G01C 3/06; G06V 20/50; G06V 20/52; G06V 10/761
See application file for complete search history.

(56) References Cited

U.S. PATENT DOCUMENTS

| | | | | |
|---|---|---|---|---|
| 10,326,927 | B2 * | 6/2019 | Sasaki | H04N 25/704 |
| 10,390,005 | B2 * | 8/2019 | Nisenzon | G06T 3/18 |
| 10,586,348 | B2 * | 3/2020 | Kawano | G06T 7/70 |
| 10,805,589 | B2 * | 10/2020 | Venkataraman | H04N 23/45 |
| 11,189,041 | B2 | 11/2021 | Takama | |
| 11,222,433 | B2 * | 1/2022 | Bae | G06T 7/246 |
| 11,776,213 | B2 | 10/2023 | Takama | |
| 11,935,182 | B2 | 3/2024 | Takama | |
| 12,008,778 | B2 * | 6/2024 | Kasuya | G01B 11/00 |
| 2002/0186216 | A1 * | 12/2002 | Baumberg | G06T 17/20 345/422 |
| 2006/0152711 | A1 * | 7/2006 | Dale | G01B 11/2755 356/139.09 |
| 2008/0180522 | A1 * | 7/2008 | Kim | H04N 13/211 348/E13.009 |
| 2013/0044212 | A1 * | 2/2013 | Uehara | H04N 23/673 348/135 |
| 2013/0308826 | A1 * | 11/2013 | Asano | G06T 5/50 382/106 |
| 2014/0267617 | A1 * | 9/2014 | Krig | H04N 13/239 348/46 |
| 2016/0148387 | A1 * | 5/2016 | Kitago | G06T 7/593 382/106 |
| 2017/0208311 | A1 * | 7/2017 | Wachi | H04N 25/61 |
| 2017/0223338 | A1 * | 8/2017 | Kang | H04N 13/25 |
| 2017/0270654 | A1 * | 9/2017 | Eldar | G06T 7/80 |
| 2017/0280063 | A1 * | 9/2017 | Jeon | B60R 1/27 |
| 2018/0130232 | A1 * | 5/2018 | Ito | G06T 7/174 |
| 2019/0130605 | A1 * | 5/2019 | Yu | G06T 7/55 |
| 2019/0139251 | A1 * | 5/2019 | Zhang | G06T 7/62 |
| 2019/0356906 | A1 | 11/2019 | Handa | |
| 2020/0160557 | A1 * | 5/2020 | Gomita | G06T 7/74 |
| 2020/0175702 | A1 | 6/2020 | Morisawa | |
| 2020/0226794 | A1 | 7/2020 | Sugio | |
| 2020/0288108 | A1 * | 9/2020 | Sheng | H04N 21/21805 |
| 2022/0113131 | A1 * | 4/2022 | Takagi | G01B 11/2536 |
| 2022/0197377 | A1 * | 6/2022 | Kim | G06F 3/013 |
| 2022/0230384 | A1 * | 7/2022 | Shin | G06T 7/50 |
| 2023/0107110 | A1 * | 4/2023 | Lu | G06T 7/251 382/100 |
| 2023/0188691 | A1 * | 6/2023 | Hergert | H04N 13/128 348/46 |
| 2023/0245333 | A1 * | 8/2023 | Mogami | G01B 11/22 382/106 |
| 2023/0289987 | A1 | 9/2023 | Takama | |
| 2024/0029256 | A1 * | 1/2024 | Xin | G06T 7/0016 |
| 2024/0205532 | A1 * | 6/2024 | Ninomiya | H04N 23/611 |
| 2024/0221210 | A1 * | 7/2024 | Wen | G06T 7/579 |
| 2024/0273742 | A1 * | 8/2024 | Das | G06V 10/768 |
| 2025/0117995 | A1 * | 4/2025 | Li | G06V 10/26 |
| 2025/0159126 | A1 * | 5/2025 | Van Nieuwenhove | H04N 13/239 |
| 2026/0044982 | A1 * | 2/2026 | Mogallapu | G01B 11/22 |

FOREIGN PATENT DOCUMENTS

| | | | | | |
|---|---|---|---|---|---|
| JP | 2015232455 | A | * | 12/2015 | G06T 7/593 |
| JP | 2019-022151 | A | | 2/2019 | |
| JP | 2020112928 | A | * | 7/2020 | |

OTHER PUBLICATIONS

Extended European Search Report issued by the European Patent Office on Jul. 16, 2024 in corresponding EP Patent Application No. 24161102.9.

* cited by examiner

| DEVICE ID 1 | DEVICE ID 2 | GROUP ID | ORIGINAL OF ALTERNATIVE |
|---|---|---|---|
| 201a | 201b | 1 | |
| 201b | 201c | 1 | |
| 201a | 201c | 2 | 201b |
| 201d | 201e | 1 | |
| 201e | 201f | 1 | |
| 201d | 201f | 2 | 201e |
| 201g | 201h | 1 | |
| 201h | 201i | 1 | |
| 201g | 201i | 2 | 201h |
| 201j | 201k | 1 | |
| 201k | 201l | 1 | |
| 201j | 201l | 2 | 201k |

FIG.6

| DEVICE ID 1 | DEVICE ID 2 | GROUP ID | ORIGINAL OF ALTERNATIVE |
|---|---|---|---|
| 201a | 201b | 1 | |
| 201b | 201c | 1 | |
| 201a | 201c | 2 | 201b |
| 71a | - | 1 | 201a |
| 71b | - | 2 | 201b |
| 71c | - | 2 | 201c |
| 201d | 201e | 1 | |
| 201e | 201f | 1 | |
| 201d | 201f | 2 | 201e |
| 201g | 201h | 1 | |
| 201h | 201i | 1 | |
| 201g | 201i | 2 | 201h |
| 201j | 201k | 1 | |
| 201k | 201l | 1 | |
| 201j | 201l | 2 | 201k |

FIG.10

| DEVICE ID 1 | DEVICE ID 2 | GROUP ID | ORIGINAL OF ALTERNATIVE |
|---|---|---|---|
| 201a | 201b | 1 | |
| 201b | 201c | 1 | |
| 201a | 201c | 2 | 201b |

FIG.12

INFORMATION PROCESSING APPARATUS FOR OBTAINING THREE-DIMENSIONAL SHAPE DATA

BACKGROUND

Field

The present disclosure relates to a technique of obtaining shape data indicating a three-dimensional shape of an object.

Description of the Related Art

There is a technique of generating an image corresponding to a view from any virtual viewpoint (hereinafter, referred to as "virtual viewpoint image") by using multiple captured images obtained by image capturing from varying directions (hereinafter, referred to as "multi-viewpoint images"). The virtual viewpoint is expressed by information indicating a position of the virtual viewpoint, a line-of-sight direction from the virtual viewpoint, and the like set in a virtual space. In order to generate the virtual viewpoint image, images capturing an object and three-dimensional shape data (hereinafter, referred to as "shape data") expressing the three-dimensional shape of the object are necessary. The shape data is expressed by, for example, a polygon mesh, point cloud, or the like. The polygon mesh is expressed by using flat surfaces of polygons such as triangles and quadrangles as elements, and the point cloud is expressed by using points as elements. For example, a volume intersection method is widely known as a method of obtaining the shape data based on the multi-viewpoint images.

It is known that the volume intersection method cannot accurately estimate the shape of the object in a recess region of the object and an object shape estimation error is large in the recess region. In the case where the object shape estimation is inaccurate, image quality of the virtual viewpoint image decreases. Japanese Patent Laid-Open No. 2008-015863 discloses a technique of correcting the shape data obtained by the volume intersection method by using information on a distance to the object obtained by using image capturing devices for generating the shape data by the volume intersection method as a stereo camera or obtained by a separately-provided range sensor.

In the technique disclosed in Japanese Patent Laid-Open No. 2008-015863, in the case where an abnormality occurs in the image capturing devices or the range sensor, the shape data obtained by the volume intersection method cannot be corrected, and the error in the object shape estimation the increases. An object of the present disclosure is to provide a technique capable of reducing the error in the object shape estimation even in the case where an abnormality occurs in the image capturing devices or the range sensor.

SUMMARY

The information processing apparatus according to the present disclosure comprises: one or more hardware processors; and one or more memories storing one or more programs configured to be executed by the one or more hardware processors, the one or more programs including instructions for: obtaining foreground information indicating a region corresponding to a foreground object in each of captured images obtained by causing a plurality of image capturing devices to perform image capturing, respectively, the plurality of image capturing devices configured to capture images of an image capturing region from directions varying from one another; obtaining distance information indicating a distance from a reference point to the foreground object; and obtaining three-dimensional shape data indicating a three-dimensional shape of the foreground object based on the foreground information and the distance information, wherein, in the case where the distance information is unobtainable by a first obtaining method, the distance information is obtained by a second obtaining method, and at least one of the first obtaining method and the second obtaining method uses at least part of the plurality of image capturing devices as a stereo camera to obtain the distance information.

Further features of the present invention will become apparent from the following description of exemplary embodiments with reference to the attached drawings.

BRIEF DESCRIPTION OF THE DRAWINGS

FIG. 6 is a diagram for explaining examples of image capturing devices decided as stereo pairs according to Embodiment 1;

FIG. 10 is a diagram for explaining examples of image capturing devices decided as stereo pairs and the range sensors decided as alternatives of the stereo pairs according to Embodiment 2;

FIG. 12 is a diagram for explaining examples of image capturing devices decided as stereo pairs according to Embodiment 3.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

Embodiment 1

In Embodiment 1, description is given of a mode in which a three-dimensional shape of an object is corrected based on distance information, the three-dimensional shape estimated by using data of captured images (hereinafter, also referred to as "captured image data") obtained by causing multiple image capturing devices to perform synchronized image capturing. Particularly, in Embodiment 1, description is given of a mode in which the image capturing devices to be used in obtaining of the distance information are decided based on abnormality information indicating abnormalities relating to the image capturing devices, and the distance information is obtained by using data of images captured by these image capturing devices. The abnormality information in the present embodiment is, for example, information indicating an image capturing device abnormality, a foreground abnormality, and a transmission abnormality. The image capturing device abnormality means failure in hardware forming the image capturing device or a case where heat, vibration, or the like is occurring in the image capturing device at a level beyond assumption made in designing. Moreover, the foreground abnormality means an abnormality in foreground information such as a case where a data amount of the captured image is large enough to put a pressure on a transmission bandwidth. Furthermore, the transmission abnormality means an abnormality in transmission of information such as a case where, in transmission of the captured image data, the foreground information, or the like, part or all of information to be transmitted is lost.

<System Configuration>

Figure 1:
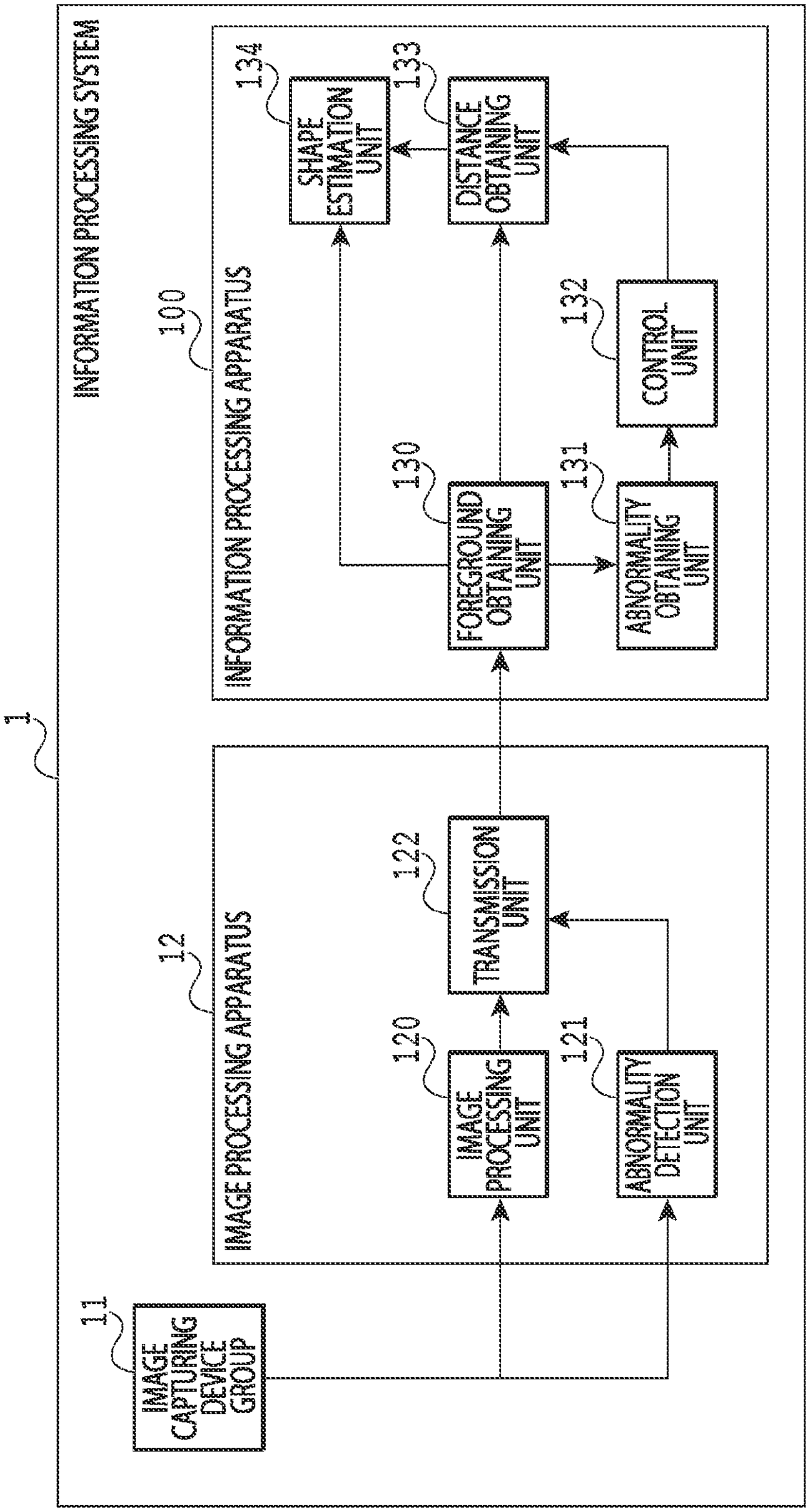
FIG. 1 is a block diagram illustrating an example of a configuration of an information processing system according to Embodiment 1.

An information processing apparatus according to Embodiment 1 is explained with reference to FIGS. 1 to 6. FIG. 1 is a block diagram illustrating an example of a configuration of an information processing system 1 according to Embodiment 1. The information processing system 1 includes an image capturing device group 11, an image processing apparatus 12, and an information processing apparatus 100. The image capturing device group 11 includes multiple image capturing devices. Note that FIG. 1 also illustrates examples of functional configurations of the image processing apparatus 12 and the information processing apparatus 100. The image processing apparatus 12 includes an image processing unit 120, an abnormality detection unit 121, and a transmission unit 122 as the functional configurations. Moreover, the information processing apparatus 100 includes a foreground obtaining unit 130, an abnormality obtaining unit 131, a control unit 132, a distance obtaining unit 133, and a shape estimation unit 134 as the functional configurations. Details of the functional configurations included in the image processing apparatus 12 and the information processing apparatus 100 are described later.

Figure 2:
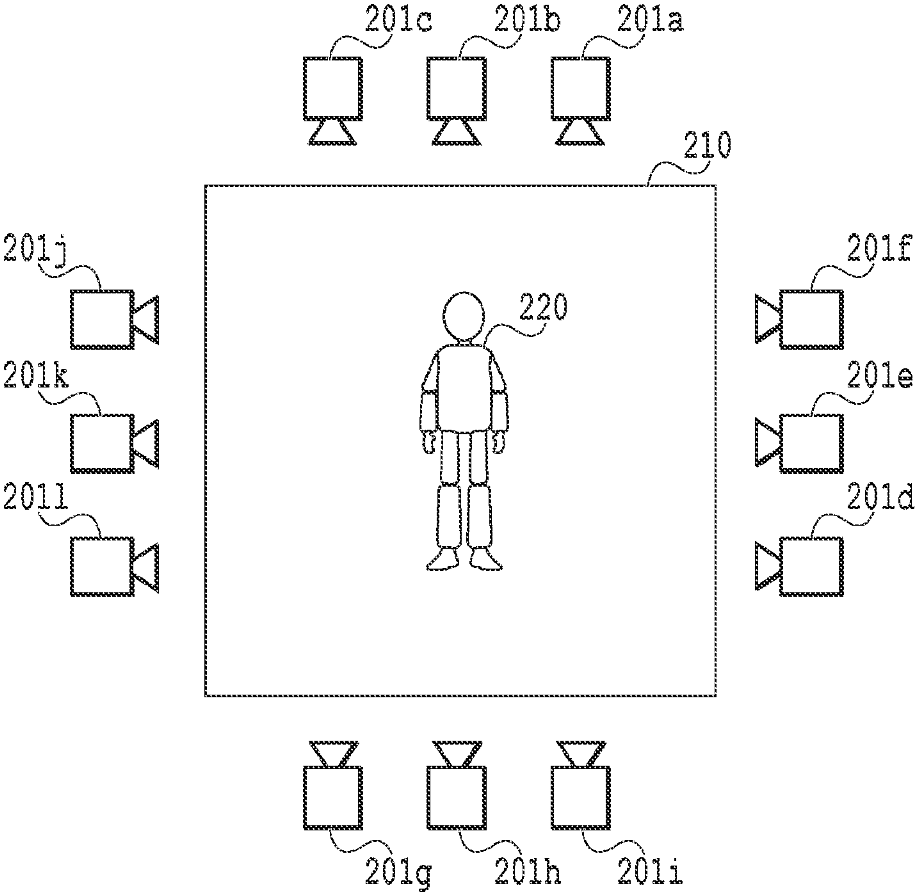
FIG. 2 is a diagram illustrating an example of arrangement of image capturing devices according to Embodiment 1.

FIG. 2 is a diagram illustrating an example of arrangement of image capturing devices 201*a* to 201*j* included in the image capturing device group 11 according to Embodiment 1. The image capturing device group 11 is formed of the multiple image capturing devices 201*a* to 201*j*. For example, as illustrated in FIG. 2, the image capturing devices 201*a* to 201*j* are arranged to capture images of an object 220 present in an image capturing region 210, from directions varying from one another. Hereinafter, the image capturing devices 201*a* to 201*j* are collectively described as image capturing devices 201. Some or all of the multiple image capturing devices 201 are devices capable of operating as one or more sets of stereo cameras that enable estimation of the distance information based on principles of stereovision. Each of the image capturing devices 201 holds identification information used to identify the image capturing devices 201 from one another.

Note that the image capturing devices 201 do not have to be arranged at such positions that the image capturing devices 201 can capture images of the object from all directions, and may be arranged at such positions that the image capturing devices 201 can capture images of the object from part of all directions due to limitation in arrangement or the like. Moreover, the number of the image capturing devices 201 forming the image capturing device group 11 can be any number. For example, in the case of capturing images of a soccer game, a rugby game, or the like, the image capturing device group 11 may include about several tens to several hundreds of image capturing devices 201 arranged around a playing field. Moreover, the image capturing device group 11 may include in combination multiple image capturing devices 201 that vary in angle of view of the image capturing such as image capturing devices capable of performing telephoto image capturing and image capturing devices capable of wide-angle image capturing. For example, all of the image capturing devices 201 included in the image capturing device group 11 perform synchronized image capturing based on one piece of time information in the real world, and image capturing time information indicating image capturing time and identification information used to identify the image capturing device 201 is appended to the data of each captured image.

<Functional Configurations of Image Processing Apparatus>

The functional configurations of the image processing apparatus 12 are described. The image processing unit 120 obtains the data of the captured images obtained by the synchronized image capturing by the image capturing devices 201. The image processing unit 120 generates data of a foreground image (hereinafter, referred to as "foreground image data") from each piece of obtained captured image data. The foreground image is an image obtained by extracting an image region (hereinafter, referred to as "foreground region") corresponding to the object (hereinafter, referred to as "foreground object") that is the foreground, from the captured image. The foreground object refers to, for example, an object (hereinafter, referred to as "dynamic object") of a moving body whose position or shape may change in the captured images in the case where image capturing is performed from the same direction in time-series. In the case where a target of image capturing is a game, examples of the dynamic object include persons such as players and referees in a field in which the game is played. Moreover, in the case where the target of image capturing is a ball sport such as soccer, a ball or the like may also be the dynamic object in addition to persons. Meanwhile, in the case where the target of image capturing is entertainment such as concert, stage performance, play, or performing arts, a person such as a singer, a player, a performer, or a host may be the dynamic object.

In the present embodiment, explanation is given assuming that the information processing system 1 includes one image processing apparatus 12, and all of the image capturing devices 201 included in the image capturing device group 11 are connected to the image processing apparatus 12. The above-mentioned connection configuration is merely an example, and the configuration may be such that the information processing system 1 includes multiple image processing apparatuses 12, and one or more image capturing devices 201 are connected to each image processing apparatus 12. The image processing apparatus 12 holds information indicating the position and orientation of each of the connected image capturing devices 201. The image processing apparatus 12 may hold, in addition to this information, information indicating a focal length, an optical center, distortion, a f-number, and the like of each of the connected image capturing devices 201. In the following explanation, pieces of information indicating the position, the orientation, the focal length, the optical center, the distortion, the f-number, and the like are collectively referred to as image capturing state information. Note that the information indicating the orientation of each image capturing device 201 is information indicating the optical axis direction or image capturing direction of the image capturing device 201. The position or orientation of each image capturing device 201 may be controlled by the image processing unit 120, or may be controlled by a pan head device that controls the position or orientation of the image capturing device 201.

In the following explanation, the image capturing state information of each image capturing device 201 is referred to as image capturing parameters. These image capturing parameters may include parameters to be controlled by other devices such as the pan head device. Parameters relating to the position and orientation of the image capturing device 201 among the image capturing parameters are so-called extrinsic parameters of the image capturing device 201, and parameters relating to the focal length, the optical center, the distortion, and the f-number of the image capturing device 201 are so-called intrinsic parameters of the image capturing device 201.

Figure 3A:
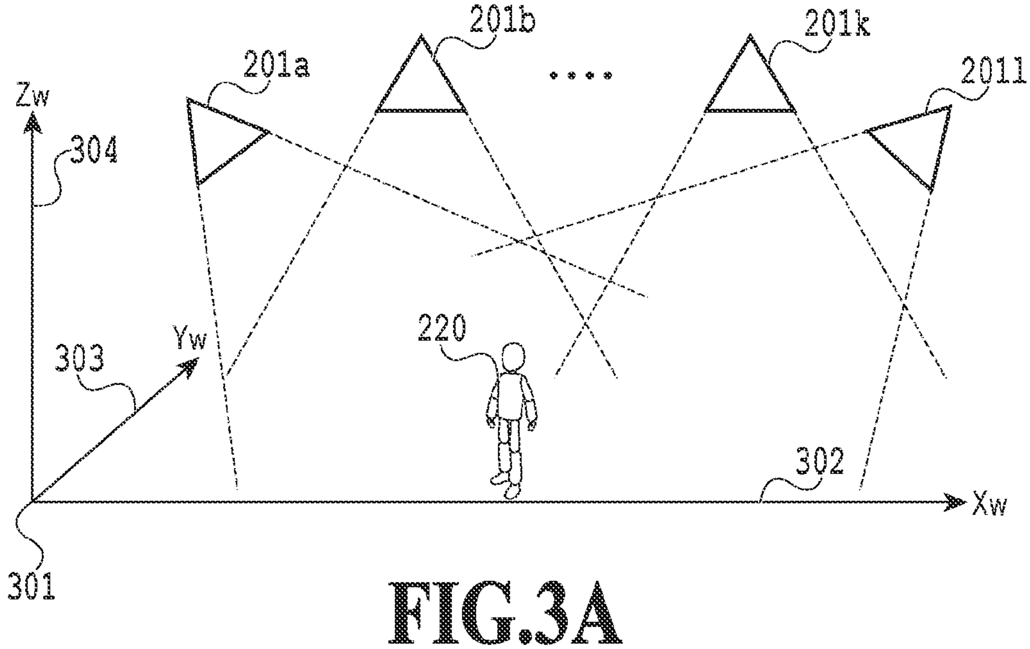
FIGS. 3A and 3B are diagrams for explaining examples of coordinate systems according to Embodiment 1.
Figure 3B:
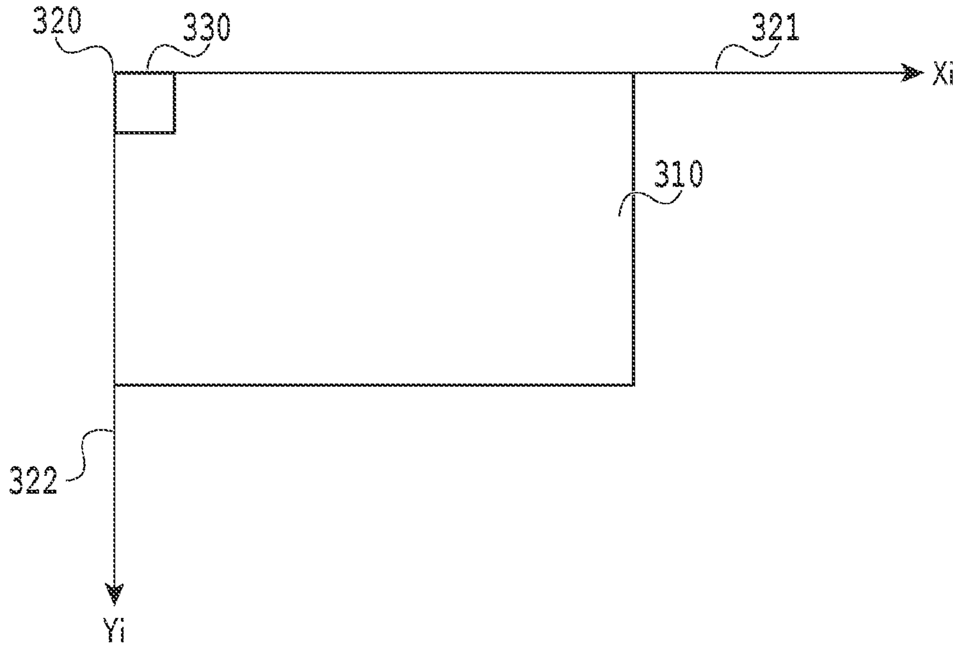

A coordinate system for expressing the image capturing parameters of the image capturing device 201 is explained with reference to FIGS. 3A and 3B. FIGS. 3A and 3B are diagrams for explaining an example of a coordinate system according to Embodiment 1. In FIG. 3A, the image capturing devices 201$a$ to 201$l$ that capture an object as an object of an image are arranged in a three-dimensional space. The parameters relating to the position and orientation of each image capturing device 201 are expressed by using a predetermined world coordinate system expressed by an origin 301, an Xw axis 302, a Yw axis 303, and a Zw axis 304 of a three-dimensional coordinate system. FIG. 3B illustrates a coordinate system (hereinafter, referred to as "image coordinate system) in a captured image 310 obtained by image capturing by each image capturing device 201. The image coordinate system is expressed by an origin 320, an Xi axis 321, and a Yi axis 322 of a two-dimensional coordinate system, and a pixel 330 is a pixel at coordinates (0, 0).

In addition to generation of the foreground image data, the image processing unit 120 detects the foreground abnormality based on the generated foreground image data, and transmits information (hereinafter, referred to as "foreground abnormality information") indicating the detected foreground abnormality, to the transmission unit 122. For example, the image processing unit 120 detects occurrence of the foreground abnormality in cases such as the case where the data amount of the foreground image data reaches such a level that the transmission of the foreground image data to the information processing apparatus 100 is impossible or the case where, in the generation processing of the foreground image data, processing load is so high that the processing cannot be performed within a predetermined period. The foreground abnormality is detected in cases where the size of the foreground region becomes enormous and the data amount of the foreground region increases. Such cases include the case where any object such as a person passes right near an optical system of the image capturing device 201 or the case where a change such as a change in illumination or a change in a flame color of firework due to special effects or the like occurs.

The abnormality detection unit 121 detects the image capturing device abnormality, and transmits information (hereinafter, referred to as "device abnormality information") indicating the detected image capturing device abnormality, to the transmission unit 122. The abnormality detection unit 121 detects an abnormality of heat or vibration or an abnormality of hardware in each image capturing device 201 such as hardware failure in the image capturing device 201, as the image capturing device abnormality. For example, a predetermined general sensor included in each image capturing device 201 measures heat or vibration, and the abnormality detection unit 121 receives the measurement value. The abnormality detection unit 121 detects the image capturing device abnormality by evaluating the received measurement value. Moreover, for example, the abnormality detection unit 121 performs monitoring of hardware abnormality notification transmitted from each image capturing device 201, and detects occurrence of the image capturing device abnormality in the image capturing device 201 upon receiving the abnormality notification.

Furthermore, for example, the abnormality detection unit 121 detects occurrence of the image capturing device abnormality also in the case where the position or orientation of the image capturing device 201 or a zoom value of the optical system unintentionally changes during the image capturing by the image capturing device 201. A general predetermined position sensor, angle sensor, or the like included in each image capturing device 201 measures the position or orientation of the image capturing device 201, and the abnormality detection unit 121 detects occurrence of the image capturing device abnormality in the case where the measurement value of this sensor changes greatly. Moreover, the abnormality detection unit 121 monitors a change in the zoom value by monitoring a control value of zoom control of the optical system, and detects occurrence of the image capturing device abnormality in the case where the zoom value changes by a value greater than a predetermined threshold.

The transmission unit 122 transmits information (hereinafter, referred to as "region information") indicating the number of foreground regions in the captured image, the foreground image data, and information expressing the position, width, and height of a rectangle circumscribing each foreground region with the image coordinate system, to the information processing apparatus 100 as the foreground information. Moreover, the transmission unit 122 also transmits the foreground abnormality information received from the image processing unit 120 and the device abnormality information received from the abnormality detection unit 121, to the information processing apparatus 100.

<Functional Configuration of Information Processing Apparatus>

The functional configuration of the information processing apparatus 100 is explained. The foreground obtaining unit 130 obtains information including the foreground information, the image capturing parameters, the device abnormality information, and the foreground abnormality information from the image processing apparatus 12. Moreover, the foreground obtaining unit 130 obtains data of a silhouette image (hereinafter, referred to as "silhouette image data") in which a region of the object in the captured image is expressed by white pixels and the other regions are expressed by black pixels or the like. For example, the foreground obtaining unit 130 obtains the silhouette image data by generating the silhouette image data. In the case where the foreground obtaining unit 130 obtains the foreground image data as the foreground information, the foreground obtaining unit 130 generates the silhouette image data by deleting information on textures from the foreground image. Specifically, for example, the foreground obtaining unit 130 generates the silhouette image data by setting the pixel values of the region where the object is absent to 0 and setting the pixel values of the object region to a value other than 0 by using the region information.

The foreground obtaining unit 130 may generate the silhouette image data based on the captured image data. In this case, for example, the foreground obtaining unit 130 obtains the captured image data of each image capturing device 201, and generates the silhouette image data based on the obtained captured image data. For example, the foreground obtaining unit 130 generates the silhouette image data by using a general method such as a background subtraction method in which a difference between the captured image capturing the object and a background image captured in advance in the state where the object is absent such as before the start of the game is calculated. The generation method of the silhouette image data is not limited to the above-mentioned method. For example, the foreground obtaining unit 130 may generate the silhouette image data by identifying the region of the object in the captured image by using a method such as a method of recognizing the target object to be the foreground such as a person.

The silhouette image data does not have to be generated by the foreground obtaining unit 130. For example, the configuration may be such that the image processing unit 120 of the image processing apparatus 12 generates the silhouette image data, and the foreground obtaining unit 130 obtains the silhouette image data by receiving the silhouette image data transmitted from the transmission unit 122. Note that the generation method of the silhouette image data in the image processing unit 120 in the case where the image processing unit 120 generates the silhouette image data is similar to the above-mentioned generation method of the silhouette image data in the foreground obtaining unit 130. The foreground information and the silhouette image data obtained by the foreground obtaining unit 130 are transmitted to the distance obtaining unit 133 and the shape estimation unit 134.

Moreover, the image capturing parameters may be obtained through calculation by the foreground obtaining unit 130, instead of being obtained from the image processing apparatus 12. In this case, for example, the foreground obtaining unit 130 first obtains data on multiple marker images obtained by causing the respective image capturing devices 201 to capture images of a marker for calibration such as a checkerboard marker in advance. Then, the foreground obtaining unit 130 extracts a characteristic point in each marker image, and associates the characteristic points in the respective marker image as corresponding points. Next, the foreground obtaining unit 130 calculates the image capturing parameters by calibrating each image capturing device 201 while performing optimization such that an error in the case where the corresponding points are projected on the image capturing device 201 is minimized. The calibration method of the image capturing device 201 may be any existing method. Note that the image capturing parameters may be obtained in synchronization with the obtaining of the captured image data or in a step of prior preparation, or obtained as necessary not in synchronization with the obtaining of the captured image data.

The abnormality obtaining unit 131 obtains the device abnormality information and the foreground abnormality information transmitted from the image processing apparatus 12. Moreover, the abnormality obtaining unit 131 detects the transmission abnormality from the image processing apparatus 12 to the information processing apparatus 100 for at least the foreground information, and generates and obtains information (transmission abnormality information) indicating the detection result. For example, in the case where the number of foreground regions in the captured images of the respective image capturing devices 201 are not identical or in the case where the information indicating the number of the foreground regions cannot be received for a predetermined period, the abnormality obtaining unit 131 determines that the transmission abnormality is occurring. In the following explanation, the device abnormality information, the foreground abnormality information, and the transmission abnormality information are collectively referred to as the abnormality information.

The control unit 132 decides the captured images to be used in the obtaining of the distance information, that is the image capturing devices 201 to be used as a stereo camera pair (hereinafter, referred to as "stereo pair") based on the abnormality information. The distance obtaining unit 133 obtains the distance information indicating the distance from the image capturing devices 201 decided to be used as the stereo pair by the control unit 132 to a surface of the object, based on the captured image data of the image capturing devices 201 and the image capturing parameters of the image capturing devices 201. The shape estimation unit 134 obtains shape data indicating a three-dimensional shape of the object by estimating the three-dimensional shape of the object based on the foreground image data, the image capturing parameters, and the distance information. The shape data is formed of, for example, point cloud data that is collection of points expressed by the three-dimensional coordinates.

<Hardware Configuration of Information Processing Apparatus>

Figure 4:
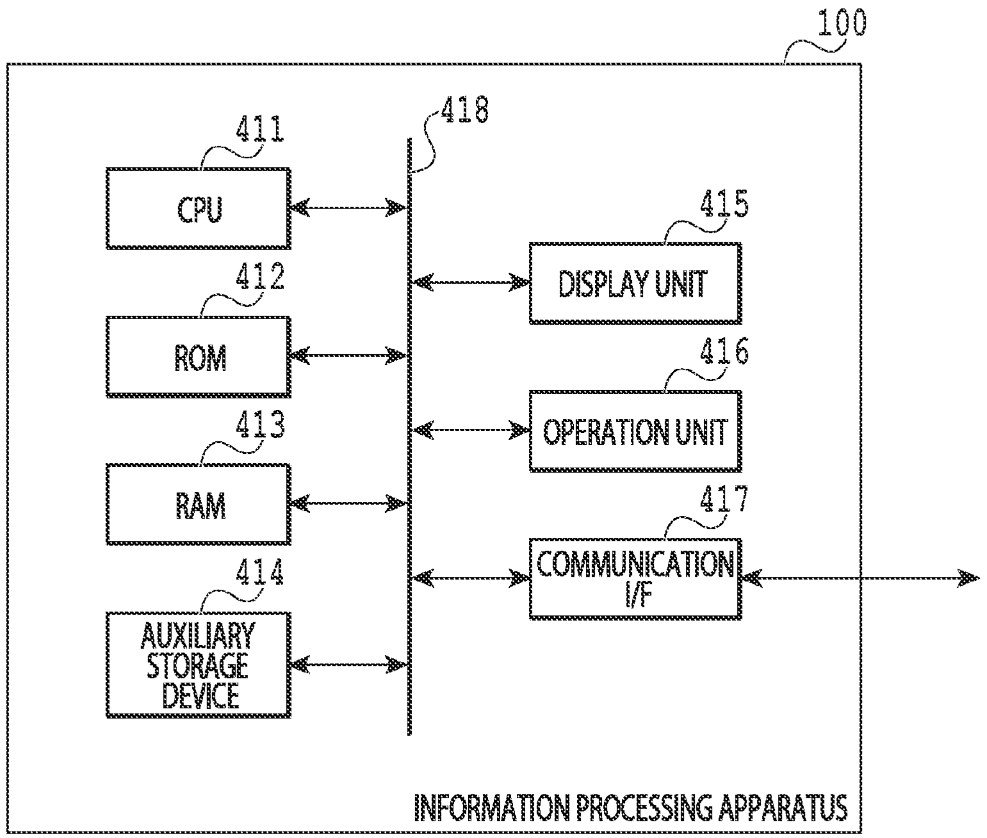
FIG. 4 is a block diagram illustrating an example of a hardware configuration of an information processing apparatus according to Embodiment 1.

A hardware configuration of the information processing apparatus 100 is explained with reference to FIG. 4. FIG. 4 is a block diagram illustrating an example of a hardware configuration of the information processing apparatus 100 according to Embodiment 1. The information processing apparatus 100 includes a CPU 411, a ROM 412, a RAM 413, an auxiliary storage device 414, a display unit 415, an operation unit 416, a communication I/F 417, and a bus 418. The CPU 411 controls the entire information processing apparatus 100 by using computer programs and data stored in the ROM 412, the RAM 413, or the auxiliary storage device 414 to implement processing of the functional configurations of the information processing apparatus 100 illustrated in FIG. 1. Note that the configuration may be such that the information processing apparatus 100 includes one or multiple pieces of dedicated hardware different from the CPU 411, and the dedicated hardware executes at least part of the processing by the CPU 411. Examples of the dedicated hardware includes an application specific integrated circuit (ASIC). A program and the like that do not have to be changed are stored in the ROM 412.

The RAM 413 temporarily stores programs and data supplied from the auxiliary storage device 414, and data and the like supplied from the outside via the communication I/F 417. The auxiliary storage device 414 is formed of, for example, a hard disk drive or the like, and stores various types of data such as image data and audio data. The display unit 415 is formed of, for example, a liquid-crystal display, a light-emitting diode (LED), or the like, and displays a graphical user interface (GUI) or the like used by the user to operate the information processing apparatus 100. The operation unit 416 is formed of a keyboard, a mouse, a joystick, a touch panel, or the like, and receives input operations from the user to input various types of instructions into the CPU 411. The CPU 411 operates also as a display control unit configured to control the display unit 415 and an operation control unit configured to control the operation unit 416.

The communication I/F 417 is used for communication between the information processing apparatus 100 and an external apparatus. For example, in the case where the information processing apparatus 100 is connected to the external apparatus by wire, a communication cable is connected to the communication I/F 417. In the case where the information processing apparatus 100 has a function of performing wireless communication with the external apparatus, the communication I/F 417 includes an antenna. The bus 418 connects the units included in the information processing apparatus 100 as the hardware configurations to one another to transmit information. In the present embodiment, explanation is given assuming that the display unit 415 and the operation unit 416 are present inside the information processing apparatus 100. However, at least one of the display unit 415 and the operation unit 416 may be present outside the information processing apparatus 100 as a separate apparatus.

<Operations of Information Processing Apparatus>

Figure 5:
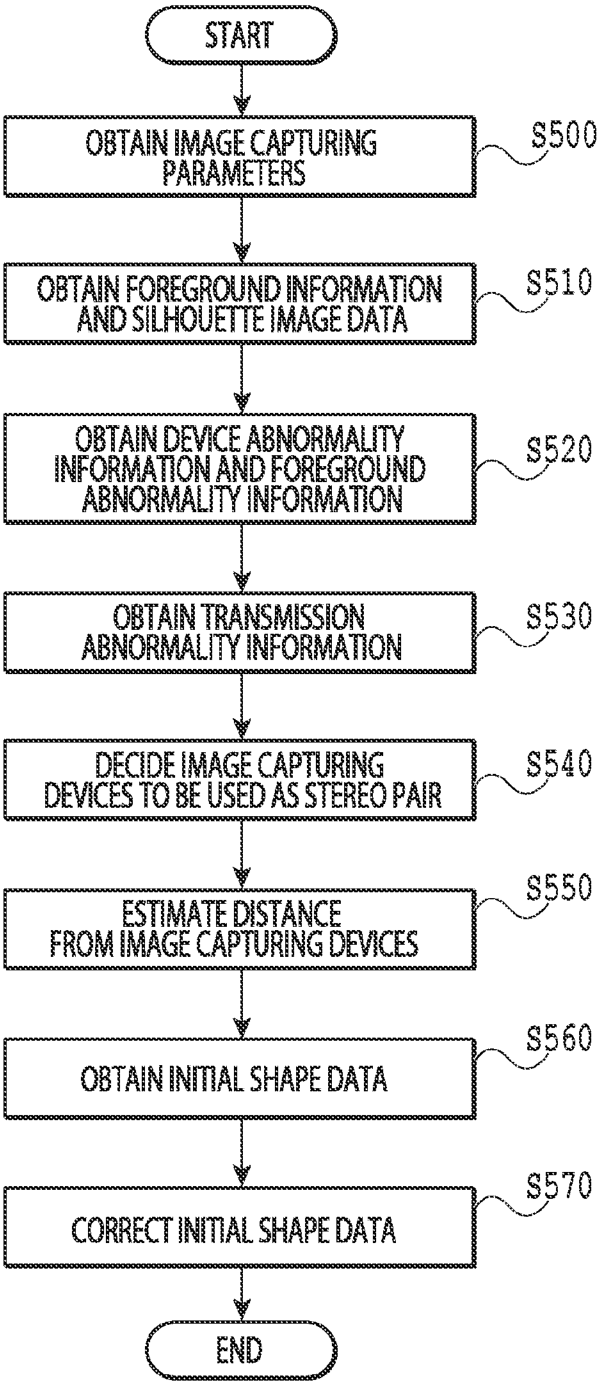
FIG. 5 is a flowchart illustrating an example of a processing flow of the information processing apparatus according to Embodiment 1.

Operations of the information processing apparatus 100 are explained with reference to FIG. 5. FIG. 5 is a flowchart illustrating an example of a processing flow of the information processing apparatus 100 according to Embodiment 1. The information processing apparatus 100 repeatedly executes the processing of the flowchart. Specifically, for example, in the case where the information processing apparatus 100 is an apparatus to which video data captured by the image capturing devices 201 is outputted, the information processing apparatus 100 repeatedly executes the processing of the flowchart for each of frames of the video. Note that sign “S” in the following explanation means step.

First, in S500, the foreground obtaining unit 130 obtains the image capturing parameters. Note that the image capturing parameters only need to be obtained at least once before processing of obtaining the distance information and processing of estimating the shape in steps to be described later. The obtained image capturing parameters are transmitted to the distance obtaining unit 133 and the shape estimation unit 134. Next, in S510, the foreground obtaining unit 130 obtains the foreground information and the silhouette image data corresponding to the image captured by each image capturing device 201.

Next, in S520, the abnormality obtaining unit 131 obtains the device abnormality information and the foreground abnormality information. For example, each of the device abnormality information and the foreground abnormality information is obtained as a bit string formed of bits as many as the number of image capturing devices 201. For example, the first bit in the bit string indicates presence or absence of an abnormality in the image capturing device 201 whose device identifier (ID) is 1, and the second bit indicates presence or absence of an abnormality in the image capturing device 201 whose device ID is 2. For example, in the case where the image capturing device group 11 includes 30 image capturing devices 201, each of the device abnormality information and the foreground abnormality information is expressed as 32-bit unassigned integer type data or the like. In this case, the presence or absence of the image capturing device abnormality or the foreground abnormality in each of the image capturing devices 201 is expressed by using a bit value of a corresponding one of the first to thirtieth bits that are lower bits in the data. For example, the case where the bit value is 0 indicates absence of an abnormality, and the case where the bit value is 1 indicates presence of an abnormality. Note that, although the bit values of the thirty-first and thirty-second bit may be any value in this case, for example, these bit values may be set to 0 to indicate absence of the image capturing devices 201 corresponding to the bits or to indicate at least absence of an abnormality.

Next, in S530, the abnormality obtaining unit 131 detects the transmission abnormality based on the foreground image data obtained in S520 or the captured image data and the silhouette image data, and generates and obtains the transmission abnormality information indicating the result of the detection. The transmission abnormality information is transmitted to the control unit 132. The transmission abnormality information is expressed by using, for example, a bit string like the device abnormality information and the foreground abnormality information. Specifically, the first bit in the bit string indicates the presence or absence of the transmission abnormality of the foreground data or the like corresponding to the captured image data of the image capturing device 201 whose device ID is 1. Moreover, the second bit indicates the presence or absence of the transmission abnormality of the foreground data or the like corresponding to the captured image data of the image capturing device 201 whose device ID is 2. For example, the case where the bit value is 0 indicates absence of an abnormality in the transmission of the foreground data or the like, and the case where the bit value is 1 indicates presence of an abnormality in the transmission of the foreground data or the like.

The transmission abnormality is detected, for example, as follows. In the case where the information processing apparatus 100 cannot obtain information indicating the number of foreground regions in the captured image within a predetermined period in a certain image capturing device 201, the abnormality obtaining unit 131 determines that an abnormality is occurring in transmission of the foreground information for the certain image capturing device 201. Then, the abnormality obtaining unit 131 sets a bit corresponding to the certain image capturing device 201 in the bit string of the transmission abnormality information to 1 as a result of the determination.

Moreover, in the case where the information processing apparatus 100 can obtain information indicating the number of foreground regions in the certain image capturing device 201, the abnormality obtaining unit 131 checks whether as many pieces of foreground image data as the number (hereinafter, referred to as “predetermined number”) indicated in the obtained information are obtained within a predetermined period. The abnormality obtaining unit 131 performs similar check for the captured image data and the silhouette image data. In the case where the information processing apparatus 100 cannot obtain the predetermined number of pieces of foreground image data, captured image data, or silhouette image data for the certain image capturing device 201, the abnormality obtaining unit 131 determines that an abnormality is occurring in the transmission of the foreground information for the certain image capturing device 201. Moreover, the abnormality obtaining unit 131 sets a bit corresponding to the certain image capturing device 201 in the bit string of the transmission abnormality information to 1 as a result of the determination.

Furthermore, in the case where the foreground obtaining unit 130 obtains the foreground image data, the captured image data, and the silhouette image data, the foreground obtaining unit 130 may detect the transmission abnormality as follows. Specifically, in this case, if the number of obtained pieces of foreground image data varies from the number of pieces of captured image data or silhouette image data in a certain image capturing device 201, the foreground obtaining unit 130 determines that part or all of the data is lost in the transmission. The foreground obtaining unit 130 thereby determines that an abnormality is occurring in the transmission of the data for the certain image capturing device 201.

Next, in S540, the control unit 132 decides the image capturing devices 201 to be used as the stereo pairs based on the abnormality information obtained in S520 and S530. Pair information indicating the decided stereo pairs is transmitted to the distance obtaining unit 133. A method of deciding the image capturing devices 201 to be used as the stereo pairs is explained with reference to FIG. 6. FIG. 6 is a diagram for explaining examples of the image capturing devices 201 to be decided as the stereo pairs according to Embodiment 1. In the case where arrangement of the image capturing devices 201 is the arrangement illustrated in FIG. 2 as an example, information corresponding to the table illustrated in FIG. 6 is created in advance, and for example, the information processing apparatus 100 obtains this information only once at the activation of the information processing apparatus 100. Identification information such as identification numbers indicating the two image capturing devices 201 forming each stereo pair are stored as item values in device ID 1 and device ID 2 in the table illustrated in FIG. 6. Moreover, in the present embodiment, information indicating a group ID and an original of alternative are stored in the table illustrated in FIG. 6. An item value in the group ID is set depending on a level of overlapping of angle of view in the stereo camera.

The stereo camera enables estimation of a distance from the image capturing devices 201 used as the stereo pair, in a region in which the angles of views of the image capturing devices 201 overlap each other. Accordingly, 1 indicating that the image capturing devices 201 are adjacent to each other and that the two image capturing devices 201 with a large angle-of-view overlapping region are used as the stereo pair is set in the group ID as the item value. Meanwhile, 2 is set as the item value in the group ID for the stereo pair in which the positions of the image capturing devices 201 are distant from each other and in which the angle-of-view overlapping region is smaller than that in the stereo pair for which 1 is set as the item value in the group ID. The distance information may be obtained by using all stereo pairs for which the item value in the group ID is set to 1 or 2 or by using only the stereo pairs for which the item value in the group ID is set to 1.

In the case where the device abnormality information, the foreground abnormality information, and the transmission abnormality information indicate that there is no abnormality for all image capturing devices 201 and all pieces of necessary foreground information are obtained, for example, the control unit 132 decides to use all pairs of image capturing devices 201 as the stereo pairs. The shape estimation unit 134 can thereby highly accurately estimate the three-dimensional shape of the object. Meanwhile, in the case where the shape estimation is performed by identifying the foreground regions in the captured images in time with the continuous image capturing by the image capturing devices 201 and transmitting the foreground information under a limitation of the transmission bandwidth or the like, the control unit 132 may decide the image capturing devices 201 to be used as the stereo pairs, for example, as follows. Specifically, in this case, the control unit 132 decides to use only the pairs of the image capturing devices 201 for which the item value in the group ID is set to 1, as the stereo pairs. The three-dimensional shape of the object can be thereby estimated at high speed without delay for the continuous image capturing by the image capturing devices 201.

The table illustrated in FIG. 6 is used to decide the image capturing devices 201 to be used as the stereo pair instead of the image capturing device 201 indicated by the item value in the original of alternative, in the case where at least one of the image capturing device abnormality, the foreground abnormality, and the transmission abnormality is occurring in the image capturing device 201 indicated by the item value in the original of alternative. Assume a case where an abnormality occurs in a certain image capturing device 201 whose device ID is set as the item value in the original of alternative. In this case, the certain image capturing device 201 cannot be used as one of the devices in the stereo pair. Accordingly, the stereo pair including the device ID of the certain image capturing device 201 in the device ID 1 or the device ID 2 does not function as the stereo camera. Thus, in this case, as an alternative to this stereo camera, the control unit 132 decides to use image capturing devices 201 of the device ID 1 and the device ID 2 in a row in which the device ID of the certain image capturing device 201 is set as the item value in the original of alternative, as the stereo pair.

For example, in the case where at least one of the image capturing device abnormality, the foreground abnormality, and the transmission abnormality is occurring in the image capturing device 201*b*, the distance information cannot be obtained by using the image capturing devices 201*a* and 201*b* as the stereo pair. Similarly, in this case, the distance information cannot be obtained by using the image capturing devices 201*b* and 201*c* as the stereo pair. As an alternative to these stereo pairs, the control unit 132 decides to use the image capturing devices 201*a* and 201*c* as the stereo pair. The distance information can be thereby obtained for a region in which the angle of view of the image capturing device 201*a* overlaps the angle of view of the image capturing device 201*c* in a region in which the angle of view of the image capturing device 201*b* overlaps the angle of view of the image capturing device 201*a* or the image capturing device 201*c*. This can reduce a region in which the distance information cannot be obtained even in the case where at least one of the image capturing device abnormality, the foreground abnormality, and the transmission abnormality is occurring in the image capturing device 201*b*.

After S540, in S550, the distance obtaining unit 133 estimates the distance from the image capturing devices 201 decided to be used as the stereo pair in S540, based on the captured image data of the image capturing devices 201, and transmits the distance information indicating the estimated distance to the shape estimation unit 134. A method of estimating the distance from the image capturing devices 201 may be a general image processing method. For example, the distance obtaining unit 133 calculates image correlation such as sum of absolute distance (SAD), and calculates parallax with pixels with large correlation set as corresponding pints. The focal lengths of the respective image capturing devices 201 used as the stereo pair and a distance (baseline length) between the image capturing devices 201 are known from the image capturing parameters. Accordingly, the distance obtaining unit 133 can calculate the distances from the image capturing devices 201 to the surface of the object corresponding to the corresponding points. The distance obtaining unit 133 calculates the distances for all corresponding points to generate a distance image (also referred to as "depth map") in which the distances from the image capturing devices 201 to the surface of the object are pixel values.

Next, in S560, the shape estimation unit 134 estimates the three-dimensional shape of the object by using the silhouette image data and the image capturing parameters obtained in S500 or S510, and obtains initial shape data that is temporary shape data indicating the three-dimensional shape of the object. For example, the shape estimation unit 134 estimates the three-dimensional shape of the object by the volume intersection method (shape from silhouette), and obtains the initial shape data.

In the case where the initial shape data is expressed in a format of point cloud data, a coordinate Xw of each point is expressed by using, for example, the same coordinate system (world coordinate system) as the coordinate system for expressing the extrinsic parameters of the image capturing devices 201. The shape estimation unit 134 divides the obtained initial shape data into point cloud information for each object, by using a general three-dimensional labeling method based on presence or absence of adjacent points, on the point cloud. An object ID being a labeling result is appended to each point. The point cloud information for each object can be obtained by specifying the object ID. The method of estimating the three-dimensional shape of the object is not limited to the volume intersection method, and the shape estimation unit 134 may estimate the three-dimensional shape of the object by using any general method. Moreover, the initial shape data is not limited to the format of point cloud data, and may be data of another format such as voxel data or polygon mesh data.

After S560, in S570, the shape estimation unit 134 corrects the initial shape data by using the distance information obtained in S550. Processing of correcting the initial shape data is explained below. First, the shape estimation unit 134 selects the image capturing devices 201 to be used for the correction of the initial shape data. Specifically, in the case where there is no abnormality for all image capturing devices 201 used as the stereo pairs, the shape estimation unit 134 selects one of the two image capturing devices 201 used as the stereo pair, for each of all stereo pairs illustrated as examples in FIG. 6. Explanation is given below assuming that the shape estimation unit 134 selects, out of the two image capturing devices 201 used as the stereo pair, the image capturing device (hereinafter, referred to as "left image capturing device") 201 on the left side as viewed in the optical axis direction. In the case where an abnormality is occurring in one of the two image capturing devices 201 used as the stereo pair, the shape estimation unit 134 selects the left image capturing device 201 in the stereo pair in which the alternative image capturing device 201 is used.

Next, the shape estimation unit 134 projects each point in the point cloud forming the initial shape data onto the each of the selected left image capturing devices 201 by using the image capturing parameters, and thereby obtains a distance d from each left image capturing device 201 to each point. For example, the shape estimation unit 134 multiplies the world coordinate Xw of each point by an extrinsic matrix Te to obtain the distance d, and thereby converts the world coordinate Xw to a coordinate Xc in a coordinate system of the image capturing device (hereinafter, referred to as "image capturing coordinate system"). In this case, the extrinsic matrix Te is a transformation matrix formed of the extrinsic parameters of the left image capturing device 201. Assuming that the position of the left image capturing device 201 is the origin and the optical axis direction of the left image capturing device 201 is the positive direction of the z axis in the image capturing coordinate system, the z coordinate of the coordinate Xc corresponds to the distance d in the case where the point in the point cloud forming the initial shape data is viewed from the left image capturing device 201.

Next, the shape estimation unit 134 identifies a pixel in the distance image generated in S550 that corresponds to each point of the point cloud forming the initial shape data to obtain a distance ds from the image capturing device 201 to the point of the point cloud that is estimated by the stereo camera. For example, the shape estimation unit 134 calculates a coordinate Xi in the image coordinate system that corresponds to the coordinate Xc obtained by converting the world coordinate Xw of each point to the image capturing coordinate system, and obtains a value of a pixel corresponding to the coordinate Xi in the distance image. The coordinate Xi is calculated by multiplying an image coordinate by an intrinsic matrix Ti, the image coordinate obtained by normalizing the coordinate Xc by the z coordinate. In this case, the intrinsic matrix Ti is a matrix formed of the intrinsic parameters of the image capturing device 201. The value of the pixel corresponding to the coordinate Xi corresponds to the distance ds from the stereo camera to the object.

Next, the shape estimation unit 134 corrects the initial shape data based on the distance d and the distance ds. Generally, it is known that the volume intersection method cannot accurately estimate the three-dimensional shape of the object in a recess region of the object. Specifically, in the three-dimensional shape in the recess region of the object estimated by the volume intersection method, the depth of the recess is sometimes smaller than the actual depth. Accordingly, the shape estimation unit 134 corrects the initial shape data by, for example, deleting points corresponding to the recess region in the initial shape data. In the case where the distance d is smaller than the distance ds, the shape estimation unit 134 determines that such a point is part of the recess region, that is a point not belonging to the object, and deletes this point from the point cloud of the initial shape data. Such processing highly-accurately corrects the recess region of the initial shape data. Moreover, in the case where the distance d is larger than the distance ds, the shape estimation unit 134 determines that such a point is a point inside the object, that is a point belonging to the object, and does not delete this point from the point cloud of the initial shape data.

The shape estimation unit 134 corrects the initial shape data by performing the above-mentioned decision for all points in the point cloud and performing the processing of deleting the points from the point cloud of the initial shape data based on the result of the decision. Note that the processing of correcting the initial shape data based on the distance d and the distance ds in the shape estimation unit 134 is not limited to the method described above. For example, the shape estimation unit 134 may correct the initial shape data in the case where the distance d and the distance ds vary from each other. Specifically, for example, in this case, the shape estimation unit 134 corrects the initial shape data by deleting a point from the point cloud of the initial shape data or adding a point to the point cloud such that the distance d becomes equal to the distance ds. After S570, the information processing apparatus 100 terminates the processing of the flowchart illustrated in FIG. 5.

According to the information processing apparatus 100 configured as described above, in the case where an abnormality occurs in an image capturing device 201 used to obtain the distance to the object, it is possible to set a stereo pair to be an alternative to a stereo pair using the device in which the abnormality is occurring. Obtaining the distance to the object based on the stereo pair set as the alternative enables reduction of the error in the object shape estimation even in the case where an abnormality occurs in the device used to obtain the distance to the object. Particularly, the object shape can be highly-accurately estimated in the recess region of the object.

Embodiment 2

The information processing apparatus 100 according to Embodiment 1 is an apparatus that uses the image capturing devices 201 included in the image capturing device group 11 as the stereo pairs in the estimation of the distance to the object. Specifically, in Embodiment 1, explanation is given of the mode in which the distance information is obtained by deciding the image capturing device 201 to be the alternative in the case where an abnormality is occurring in the image capturing device 201 to be used as the stereo pair. Meanwhile, in Embodiment 2, explanation is given of a mode in which the distance information is obtained by using not only the stereo cameras formed of the image capturing devices 201 included in the image capturing device group 11 but also methods different from these stereo cameras.

<System Configuration>

Figure 7:
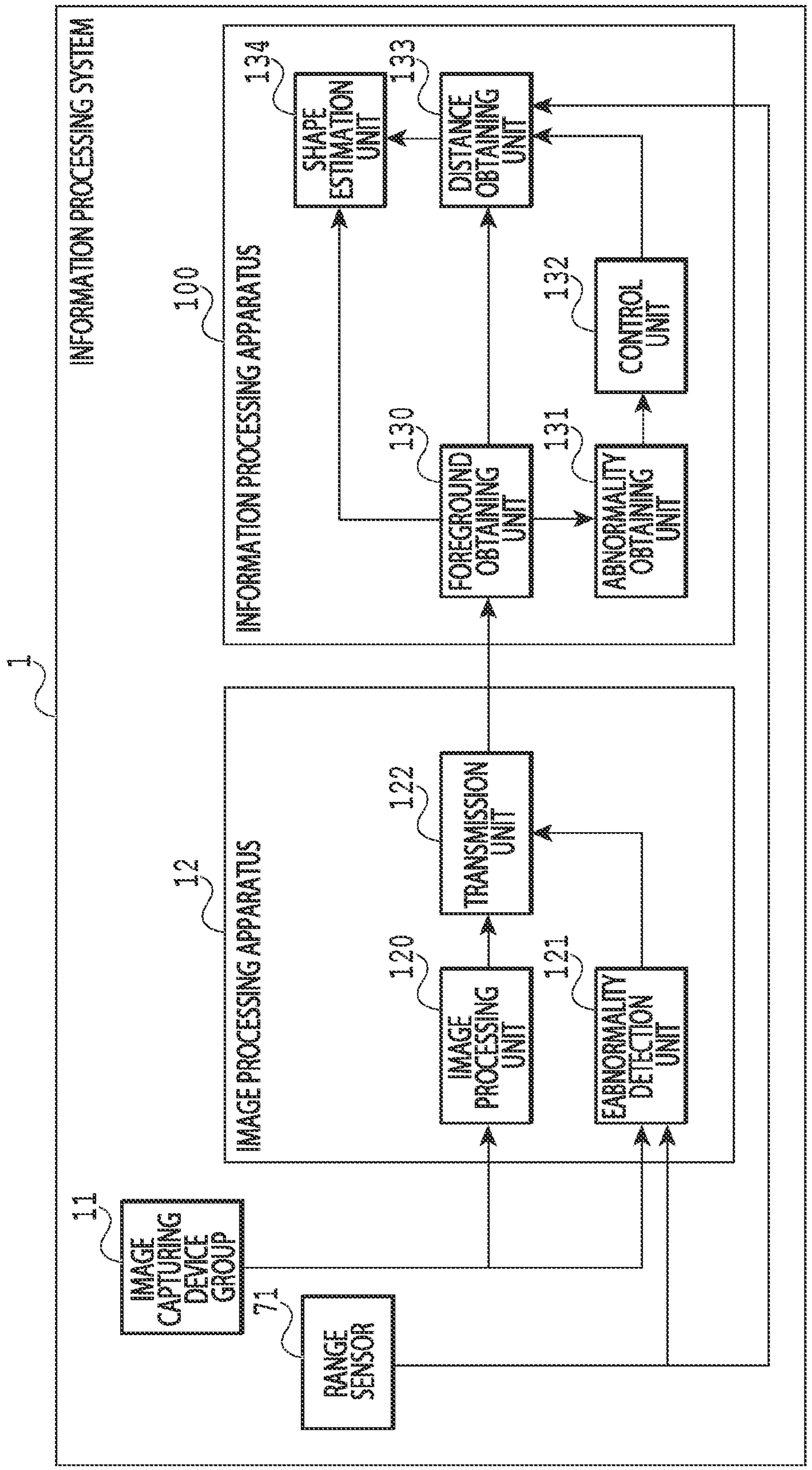
FIG. 7 is a block diagram illustrating an example of a configuration of an information processing system according to Embodiment 2.

FIG. 7 is a block diagram illustrating an example of a configuration of an information processing system 1 according to Embodiment 2 (hereinafter, simply referred to as "information processing system 1"). The information processing system 1 includes the image capturing device group 11, range sensors 71, the image processing apparatus 12, and the information processing apparatus 100. The range sensors 71 are devices configured to measure a distance by observing a reflected wave of light, a radio wave, or the like emitted to an object. The range sensors 71 each generate information (hereinafter, referred to as "sensor distance information") such as point cloud data or distance image data indicating a distance from the range sensor 71 to the object based on a result of the above measurement. For example, the range sensors 71 are light detection and ranging (LIDAR) devices, radio detection and ranging (radar) devices, or the like. The range sensors 71 may each be a combination of a stereo camera provided in advance separate from the image capturing device group 11 and a device configured to obtain the sensor distance information based on captured images obtained by image capturing of the stereo camera. The range sensors 71 transmit the generated sensor distance information to the information processing apparatus 100.

Figure 8:
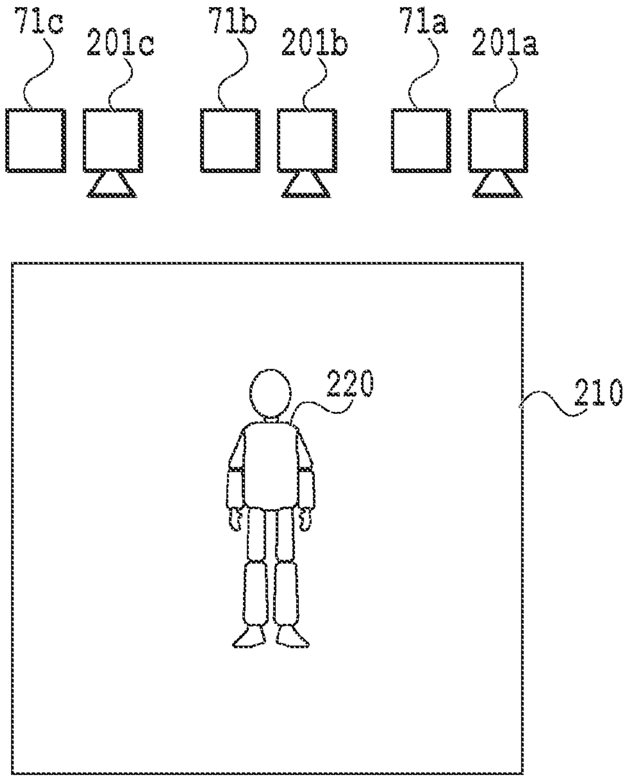
FIG. 8 is a diagram illustrating an example of arrangement of range sensors according to Embodiment 2.

For example, the information processing system 1 includes multiple range sensors 71, and each range sensor 71 holds identification information such as an identification number for identifying pieces of sensor distance information generated by the range sensors 71 different from one another. The range sensors 71 are arranged at positions near the image capturing devices 201. FIG. 8 is a diagram illustrating an example of arrangement of the range sensors 71 according to Embodiment 2. For example, in the case where the information processing system 1 includes multiple range sensors 71, as illustrated in FIG. 8 as an example, a range sensor 71*a* is arranged near the image capturing device 201*a*, a range sensor 71*b* is arranged near the image capturing device 201*b*, and a range sensor 71*c* is arranged near the image capturing device 201*c*.

In the case where an abnormality occurs in a certain image capturing device 201 used as one of the image capturing devices in the stereo pair, the range sensor 71 corresponding to this stereo pair is used as an alternative of this stereo pair. Note that the multiple range sensors 71 do not have to be arranged around the entire periphery of the image capturing region 210, and may be arranged only in part of the entire periphery of the image capturing region 210 such as only in some directions depending on limitations in arrangement or the like. Moreover, the range sensors 71 do not have to be arranged near the image capturing devices 201, or do not have to be in one-to-one relationship with the image capturing devices 201. Furthermore, the number of the range sensors 71 can be any number, and for example, about several tens of range sensors 71 may be arranged around the image capturing region 210. Moreover, all range sensors 71 are synchronized with one another to use the same time like the image capturing devices 201, and measure the distances in synchronization with the image capturing of the image capturing devices 201. Time information indicating the time of the distance measurement and identification information for identifying the range sensor 71 are appended to the sensor distance information generated by each range sensor 71.

<Functional Configurations of Image Processing Apparatus>

The image processing apparatus 12 according to Embodiment 2 (hereinafter, simply referred to as "image processing apparatus 12") includes the image processing unit 120, the abnormality detection unit 121, and the transmission unit 122. The image processing unit 120 according to Embodiment 2 (hereinafter, simply referred to as "image processing unit 120") has, in addition to similar functions to the image processing unit 120 according to Embodiment 1, a function of receiving the sensor distance information transmitted by the range sensors 71 and processing the received information.

Specifically, the image processing unit 120 performs processing of smoothing the values of the distances in the received sensor distance information and processing of removing information outside a region in which the object moves in the sensor distance information such as the point cloud data or the distance image data, as noise. Moreover, the image processing unit 120 determines that a distance abnormality has occurred in the following case. For example, the distance from the range sensor 71 in the point cloud is extremely small, or a predetermined number or more of pixels whose pixel values are extremely small are present in the distance image. In such a case, it can be considered that a body other than the object has passed right near the range sensor 71. Accordingly, the image processing unit 120 determines that the distance abnormality has occurred. In this case, the distance abnormality means occurrence of an abnormality in the sensor distance information received from the range sensor 71. The image processing unit 120 generates information indicating the distance abnormality (hereinafter, referred to as "distance abnormality information"), and transmits the distance abnormality information to the transmission unit 122 according to Embodiment 2 (hereinafter, simply referred to as "transmission unit 122").

The abnormality detection unit 121 according to Embodiment 2 (hereinafter, simply referred to as "abnormality detection unit 121") has, in addition to similar functions to the abnormality detection unit 121 according to Embodiment 1, a function of detecting an abnormality of the range sensor. For example, in the case where the abnormality detection unit 121 receives a signal indicating that an abnormality such as hardware failure has occurred in the range sensor 71, the abnormality detection unit 121 determines that an abnormality has occurred in the range sensor 71. Hereinafter, this abnormality is referred to as sensor abnormality. In the case where the image processing unit 120 cannot receive the sensor distance information from a certain range sensor 71 for a predetermined period, the abnormality detection unit 121 may determine that the sensor abnormality is occurring in the certain range sensor 71. The abnormality detection unit 121 generates information (hereinafter, referred to as "sensor abnormality information") indicating the sensor abnormality, and transmits the generated information to the transmission unit 122.

The transmission unit 122 has, in addition to similar functions to the transmission unit 122 according to Embodiment 1, a function of transmitting the sensor distance information received from the range sensors 71, the sensor abnormality information generated by the abnormality detection unit 121, and the distance abnormality information generated by the image processing unit 120. Moreover, in the case where the sensor distance information is the point cloud data, the transmission unit 122 transmits the point cloud data indicating the three-dimensional coordinates of each point as the sensor distance information, and transmits the total number of points included in the point cloud. Meanwhile, in the case where the sensor distance information is the distance image data, the transmission unit 122 transmits the distance image data as the sensor distance information, and transmits the total number of pixels whose pixel values are greater than 0.

<Configuration of Information Processing Apparatus>

The information processing apparatus 100 according to Embodiment 2 (hereinafter, simply referred to as "information processing apparatus 100") includes the foreground obtaining unit 130, the abnormality obtaining unit 131, the control unit 132, the distance obtaining unit 133, and the shape estimation unit 134. The foreground obtaining unit 130 according to Embodiment 2 (hereinafter, simply referred to as "foreground obtaining unit 130") has the following function in addition to similar functions to the foreground obtaining unit 130 according to Embodiment 1. Specifically, the foreground obtaining unit 130 has a function of receiving information on the range sensors 71 such as the sensor distance information transmitted from the transmission unit 122 of the image processing apparatus 12. Although the explanation is given above assuming that the sensor distance information is processed in the image processing unit 120 of the image processing apparatus 12, the sensor distance information may be processed in the information processing apparatus 100. In this case, for example, the foreground obtaining unit 130 receives the sensor distance information transmitted from each range sensor 71, and performs processing similar to the processing on the sensor distance information in the image processing unit 120. Note that a transmission source of the sensor distance information is not limited to the range sensors 71, and the sensor distance information may be received by reading the sensor distance information stored in advance in a not-illustrated auxiliary storage device.

The information processing apparatus 100 converts the three-dimensional coordinates of each point or a value of each pixel in the sensor distance information of data such as the point cloud data and the distance image data, to the image capturing coordinate system, and uses the converted values for the correction of the shape data. Accordingly, the foreground obtaining unit 130 executes calibration of the range sensors 71 and the image capturing devices 201, and obtains conversion parameters for converting the sensor distance information to the image capturing coordinate system. This calibration may be performed by a general method. For example, the conversion parameters can be calculated by capturing an image of a predetermined object such as a cube and optimizing the parameters such that an edge where a change in a luminance value of the captured image is great matches an edge where a change in the pixel value of the distance image is great. In the case where the range sensors 71 are sensors configured to obtain the sensor distance information as the point cloud data, the conversion parameters can be optimized based on a distance image in which each point in the point cloud is projected onto a sensor plane. The conversion parameters may be obtained in synchronization with the obtaining of the captured image data, obtained in a stage of prior preparation, or obtained as necessary not in synchronization with the obtaining of the captured image data.

The abnormality obtaining unit 131 according to Embodiment 2 (hereinafter, simply referred to as "abnormality obtaining unit 131") has the following function in addition to similar functions to the abnormality obtaining unit 131 according to Embodiment 1. Specifically, the abnormality obtaining unit 131 has a function of detecting an abnormality (hereinafter, referred to as "distance transmission abnormality") relating to transmission of the information on the range sensors 71 such as the sensor distance information from the image processing apparatus 12 to the information processing apparatus 100. For example, in the case where the information processing apparatus 100 cannot receive the information on a certain range sensor 71 such as the sensor distance information from the transmission unit 122 for a predetermined period, the abnormality obtaining unit 131 determines that an abnormality is occurring in the transmission of the information in the certain range sensor 71. The abnormality obtaining unit 131 may determine that the distance transmission abnormality is occurring in the case where the information indicating the total number of points included in the point group or the information indicating total number of pixels whose pixel values are greater than 0 cannot be received. The abnormality obtaining unit 131 generates information indicating the distance transmission abnormality (hereinafter, referred to as "sensor transmission abnormality information"), and transmits the generated information to the control unit 132.

The control unit 132 according to Embodiment 2 decides the image capturing devices 201 and the range sensors 71 to be used as the stereo pairs, to be used for the obtaining of the distance information to be used in the correction of the shape data, based on the distance abnormality information, the sensor abnormality information, and the sensor transmission abnormality information, in addition to the abnormality information. Hereinafter, the control unit 132 according to Embodiment 2 is simply referred to as "control unit 132". A method of deciding the image capturing devices 201 to be used as the stereo pairs and the range sensors 71 in the control unit 132 is described later. The distance obtaining unit 133 according to Embodiment 2 (hereinafter, simply referred to as "distance obtaining unit 133") obtains the distance information. Specifically, the distance obtaining unit 133 obtains the distance information based on the captured image data of the image capturing devices 201 to be used as the stereo pairs decided by the control unit 132 and the image capturing parameters of these image capturing devices 201. Moreover, the distance obtaining unit 133 obtains the distance information based on the sensor distance information of the range sensors 71 decided by the control unit 132. Note that, since the shape estimation unit 134 according to Embodiment 2 (hereinafter, simply referred to as "shape estimation unit 134") is similar to the shape estimation unit 134 according to Embodiment 1, explanation thereof is omitted. Moreover, since the hardware configuration of the information processing apparatus 100 is similar to that of the information processing apparatus 100 according to Embodiment 1, explanation thereof is omitted.

<Operations of Information Processing Apparatus>

Figure 9:
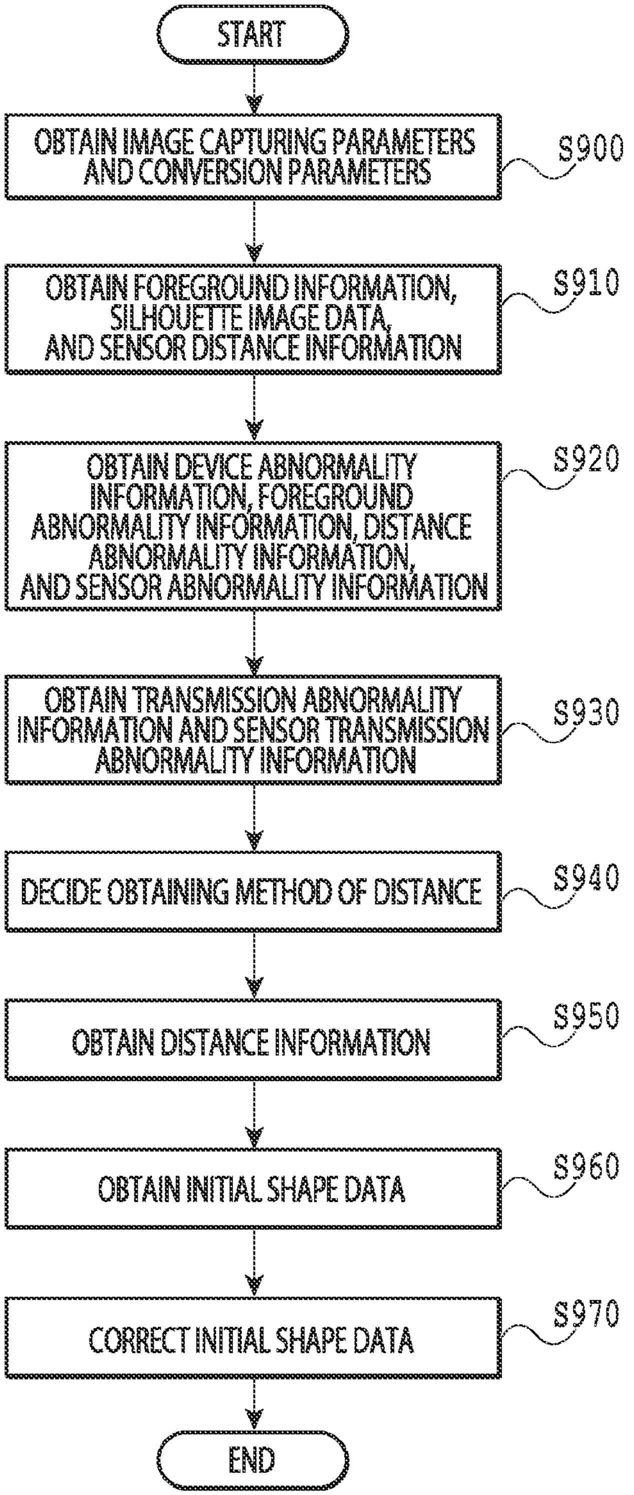
FIG. 9 is a flowchart illustrating an example of a processing flow of an information processing apparatus according to Embodiment 2.

Operations of the information processing apparatus 100 are explained with reference to FIG. 9. FIG. 9 is a flowchart illustrating an example of a processing flow of the information processing apparatus 100 according to Embodiment 2. The information processing apparatus 100 repeatedly executes the processing of the flowchart. First, in S900, the foreground obtaining unit 130 obtains the image capturing parameters and the conversion parameters for converting the sensor distance information to the image capturing coordinate system. In the present embodiment, as an example, explanation is given of a mode in which, in the case where an abnormality is occurring in the image capturing device 201 used as the stereo pair, the range sensor 71 is used as an alternative to the stereo camera. For example, the range sensor 71 is associated in advance with the image capturing device 201 being an original of alternative. Details of association of the range sensor 71 and the image capturing device 201 being the original of alternative are described later. Note that the image capturing parameters and the conversion parameters only need to be obtained at least once before processing of obtaining the distance information and processing of estimating the shape in steps to be described later. The obtained image capturing parameters and conversion parameters are transmitted to the distance obtaining unit 133 and the shape estimation unit 134.

Next, in S910, the foreground obtaining unit 130 obtains the foreground information and the silhouette image data corresponding to the captured image of each image capturing device 201 and the sensor distance information corresponding to each range sensor 71. Subsequently in S910, the foreground obtaining unit 130 converts the obtained sensor distance information to the image capturing coordinate system by using the conversion parameters obtained in S900. The sensor distance information converted to the image capturing coordinate system is transmitted to the abnormality obtaining unit 131. Next, in S920, the abnormality obtaining unit 131 obtains the device abnormality information, the foreground abnormality information, the distance abnormality information, and the sensor abnormality information. The sensor abnormality information is obtained as, for example, the identification information of the range sensor 71 in which the sensor abnormality is occurring. Moreover, the distance abnormality information is obtained as, for example, the identification information of the range sensor 71 in which the distance abnormality is occurring. Next, in S930, the abnormality obtaining unit 131 detects the transmission abnormality and the sensor transmission abnormality, and generates the transmission abnormality information and sensor transmission abnormality information that indicate the results of these detections. The sensor transmission abnormality information is obtained as the identification information of the range sensor 71 in which the sensor transmission abnormality is occurring.

Next, in S940, the control unit 132 decides the stereo pairs and the range sensors 71 to be used in the obtaining of the distance information based on the abnormality information, the distance abnormality information, the sensor abnormality information, and the sensor transmission abnormality information obtained in S920 and 930. The pair information indicating the decided stereo pairs and the identification information of the decided range sensors 71 are transmitted to the distance obtaining unit 133. The method of deciding the image capturing devices 201 to be used as the stereo pairs and the range sensors 71 is explained with reference to FIG. 10. FIG. 10 is a diagram for explaining examples of the image capturing devices 201 decided as the stereo pairs and the range sensors 71 decided to be alternatives of the stereo pairs according to Embodiment 2. In the case where the arrangement of the image capturing devices 201 and the range sensors 71 is the arrangement illustrated in FIG. 8 as an example, information corresponding to the table illustrated in FIG. 10 is created in advance, and for example, the information processing apparatus 100 obtains this information only once at the activation of the information processing apparatus 100.

In the table illustrated in FIG. 10, the identification information indicating the two image capturing devices 201 forming each stereo pair is stored as item values in the device ID 1 and the device ID 2. Since the meaning of the item value in the group ID is similar to those in Embodiment 1, explanation thereof is omitted. Although the meaning of the item value in the original of alternative is similar to that in Embodiment 1, in the present embodiment, in the case where some sort of abnormality is occurring in the image capturing device 201 indicated by the item value in the original of alternative, the alternative to the stereo pair using this image capturing device 201 is decided as follows. Specifically, the range sensor 71 indicated by the item value in the device ID 1 in the same row or a stereo camera using, as the stereo pair, the two image capturing devices 201 indicated by the item values in the device ID 1 and the device ID 2 in the same row is decided as the alternative to the stereo pair.

In the case where there is no abnormality in all image capturing devices 201 and all pieces of necessary foreground information can be obtained, the control unit 132 decides to use all pairs of the image capturing devices 201 as the stereo pairs. The shape estimation unit 134 can thereby highly-accurately estimate the three-dimensional shape of the object. Meanwhile, in the case where the shape estimation is performed by identifying the foreground regions in the captured images in time with the continuous image capturing by the image capturing devices 201 and transmitting the foreground information under the limitation of the transmission bandwidth or the like, for example, the control unit 132 decides to use only the stereo pairs for which the item value in the group ID is 1. The three-dimensional shape of the object can be thereby estimated at high speed without delay for the continuous image capturing by the image capturing devices 201. The table illustrated in FIG. 10 is used to decide the image capturing devices 201 or the range sensor 71 to be used as the alternative to the image capturing device 201 indicated by the item value in the original of alternative in the case where at least one of the image capturing device abnormality, the foreground abnormality, and the transmission abnormality is occurring in the image capturing device 201 indicated by the item value in the original of alternative. Specifically, if the identification information indicating the range sensor 71 is stored as the item value in the device ID 1 in the corresponding row in this case, this range sensor 71 is decided to be used instead of the stereo pair using the image capturing device 201 in which an abnormality is occurring.

For example, in the case where at least one of the image capturing device abnormality, the foreground abnormality, and the transmission abnormality is occurring in the image capturing device 201*a*, the distance information cannot be obtained by using the image capturing devices 201*a* and 201*b* as the stereo pair. Accordingly, in this case, the control unit 132 decides to use the range sensor 71*a* as an alternative to this stereo pair. The distance information can be thereby obtained by using the range sensors 71*a* for a region other than a region in which the angle of view of the image capturing device 201*b* overlaps the angle of view of the image capturing device 201*c* in a region in which the angle of view of the image capturing device 201*a* overlaps the angle of view of the image capturing device 201*b*. This can reduce the region in which the distance information cannot be obtained even in the case where at least one of the image capturing device abnormality, the foreground abnormality, and the transmission abnormality is occurring in the image capturing device 201*a*.

Moreover, for example, in the case where the above-mentioned some sort of abnormality is occurring in the image capturing device 201*b*, the distance information cannot be obtained by using the image capturing devices 201*a* and 201*b* or the image capturing devices 201*b* and 201*c* as the stereo pair. The control unit 132 decides to use the image capturing devices 201*a* and 201*c* or the range sensor 71*b* as the alternative to these stereo pairs, the image capturing devices 201*a* and 201*c* being used as the stereo pair. For example, assume a case where more-accurate distance information can be obtained if the image capturing devices 201 capable of capturing higher resolution images than the range sensors 71 are used as the stereo camera. In this case, the control unit 132 decides to use the image capturing devices 201*a* and 201*c* as the stereo pair, as the alternative. The distance information can be thereby obtained for the measurement region of the range sensor 71*b* or the region in which the angle of view of the image capturing device 201*a* overlaps the angle of view of the image capturing device 201*c*, in the region in which the angle of view of the image capturing device 201*b* overlaps the angle of view of the image capturing device 201*a* or the image capturing device 201*c*. This can reduce the region in which the distance information cannot be obtained even in the case where at least one of the image capturing device abnormality, the foreground abnormality, and the transmission abnormality is occurring in the image capturing device 201*b*.

Note that, in the case where an abnormality is occurring in one of the image capturing devices 201*a* and 201*c* in addition to the image capturing device 201*b*, the distance information cannot be obtained in all stereo pairs using the image capturing device 201*a*, 201*b*, or 201*c*. Accordingly, in such a case, for example, the control unit 132 decides to use the range sensors 71*a*, 71*b*, and 71*c* whose originals of alternatives are the image capturing devices 201*a*, 201*b*, and 201*c*, as alternatives of these stereo pairs. Meanwhile, in the case where abnormalities are occurring in the device being the original of alternative and the device being the alternative, the distance information using these devices cannot be obtained. Accordingly, in such a case, for example, the control unit 132 performs control such that this distance information is not used in the estimation of the three-dimensional shape of the object in the shape estimation unit 134.

After S940, in S950, the distance obtaining unit 133 obtains the distance information by using the stereo pairs and the range sensors 71 decided in S940, and transmits the obtained distance information to the shape estimation unit 134. Note that since the method of estimating the distance from the image capturing devices 201 being the stereo pair is explained in detail in Embodiment 1, explanation is omitted. Moreover, obtaining of the distance information using the range sensors 71 in the range sensor 71*b* is reception of the distance image data being the processed sensor distance information from the foreground obtaining unit 130.

Next, in S960, the shape estimation unit 134 estimates the three-dimensional shape of the object by using the silhouette image data and the image capturing parameters obtained in S900 or S910, and obtains the initial shape data. Since the processing of S960 is similar to the processing of S560 according to Embodiment 1, explanation is omitted. Next, in S970, the shape estimation unit 134 corrects the initial shape data by using the distance information obtained in S950. Processing of correcting the initial shape data according to the present embodiment is explained below.

First, the shape estimation unit 134 selects the image capturing devices 201 to be used for the correction of the initial shape data. Specifically, in the case where there is no abnormality for all image capturing devices 201 used as the stereo cameras, the shape estimation unit 134 selects one of the two image capturing devices 201 used as the stereo pair, for all stereo pairs illustrated as examples in FIG. 10. In the present embodiment, explanation is given assuming that the shape estimation unit 134 selects the left image capturing devices 201 like the shape estimation unit 134 according to Embodiment 1. In the case where an abnormality is occurring in one of the two image capturing devices 201 used as the stereo pair, this stereo pair is replaced by another stereo pair or the range sensor 71 decided by the control unit 132.

In the case where the alternative to the stereo pair decided by the control unit 132 is another stereo pair, for example, the shape estimation unit 134 selects the left image capturing device 201 in the another stereo pair being the alternative. Moreover, the shape estimation unit 134 obtains the distance d and the distance ds from each of the selected left image capturing devices 201 to each point by using the image capturing parameters of the image capturing device 201. In the case where the alternative to the stereo pair decided by the control unit 132 is the range sensor 71 configured to obtain point cloud, the shape estimation unit 134 obtains the distance d and the distance ds by using the image capturing parameters of the original of alternative associated with this range sensor 71. In the case where the alternative to the stereo pair decided by the control unit 132 is the range sensor 71 formed of the stereo camera configured to obtain the distance image, the shape estimation unit 134 obtains the distance d and the distance ds by using the image capturing parameters of this range sensor 71.

Since the methods of obtaining the distance d and the distance ds in the shape estimation unit 134 are similar to the obtaining methods in the shape estimation unit 134 according to Embodiment 1, detailed explanation of obtaining of the distance d and the distance ds is omitted. Next, the shape estimation unit 134 corrects the initial shape data based on the obtained distance d and distance ds. Since the processing of correcting the initial shape data in the shape estimation unit 134 is similar to the correction method in the shape estimation unit 134 according to Embodiment 1, explanation is omitted. After S970, the information processing apparatus 100 terminates the processing of the flowchart illustrated in FIG. 9.

According to the information processing apparatus 100 configured as described above, in the case where an abnormality occurs in the image capturing device 201 for obtaining the distance to the object, it is possible to set the range sensor as an alternative to the stereo pair using the device in which the abnormality is occurring, in addition to another stereo pair. Obtaining the distance to the object based on the stereo pair or the range sensor set as the alternative enables reduction of an error in the object shape estimation even in the case where an abnormality occurs in the device for obtaining the distance to the object. Particularly, the object shape can be highly-accurately estimated in the recess region of the object. Moreover, according to the information processing apparatus 100, in the case where an abnormality occurs in the image capturing device 201 or the like arranged in an end portion or the like, the range sensor capable of estimating the distance can be set as an alternative for a region in which the distance cannot be estimated by the alternative stereo pair. As a result, a region in which the initial shape data cannot be corrected in the case where an abnormality occurs in the image capturing device 201 can be further reduced from that in the information processing apparatus 100 according to Embodiment 1.

Note that, in Embodiment 2, the distance information is obtained by using the image capturing devices 201 included in the image capturing device group 11 as the stereo pair in the initial state, and if an abnormality occurs in the image capturing devices 201 used in this stereo pair, the range sensor 71 is used as the alternative to the stereo pair. However, the mode of usage of the range sensor 71 is not limited this. For example, the configuration may be such that the distance information is obtained by using the range sensor 71 in the initial state, and if an abnormality occurs in the range sensor 71, the distance information is obtained by using the image capturing devices 201 included in the image capturing device group 11 as the stereo pair as an alternative to the range sensor 71.

Embodiment 3

The information processing apparatuses 100 according to Embodiments 1 and 2 are apparatuses including the distance obtaining unit 133 configured to obtain the distance information and the shape estimation unit 134 configured to estimate the three-dimensional shape of the object, as the functional configurations. In Embodiment 3, explanation is given of an information processing system in which the information processing apparatus 100 is divided into an apparatus (hereinafter, referred to as "first information processing apparatus") configured to obtain the distance information and an apparatus (hereinafter, referred to as "second information processing apparatus") configured to estimate the three-dimensional shape of the object.

<System Configuration>

Figure 11:
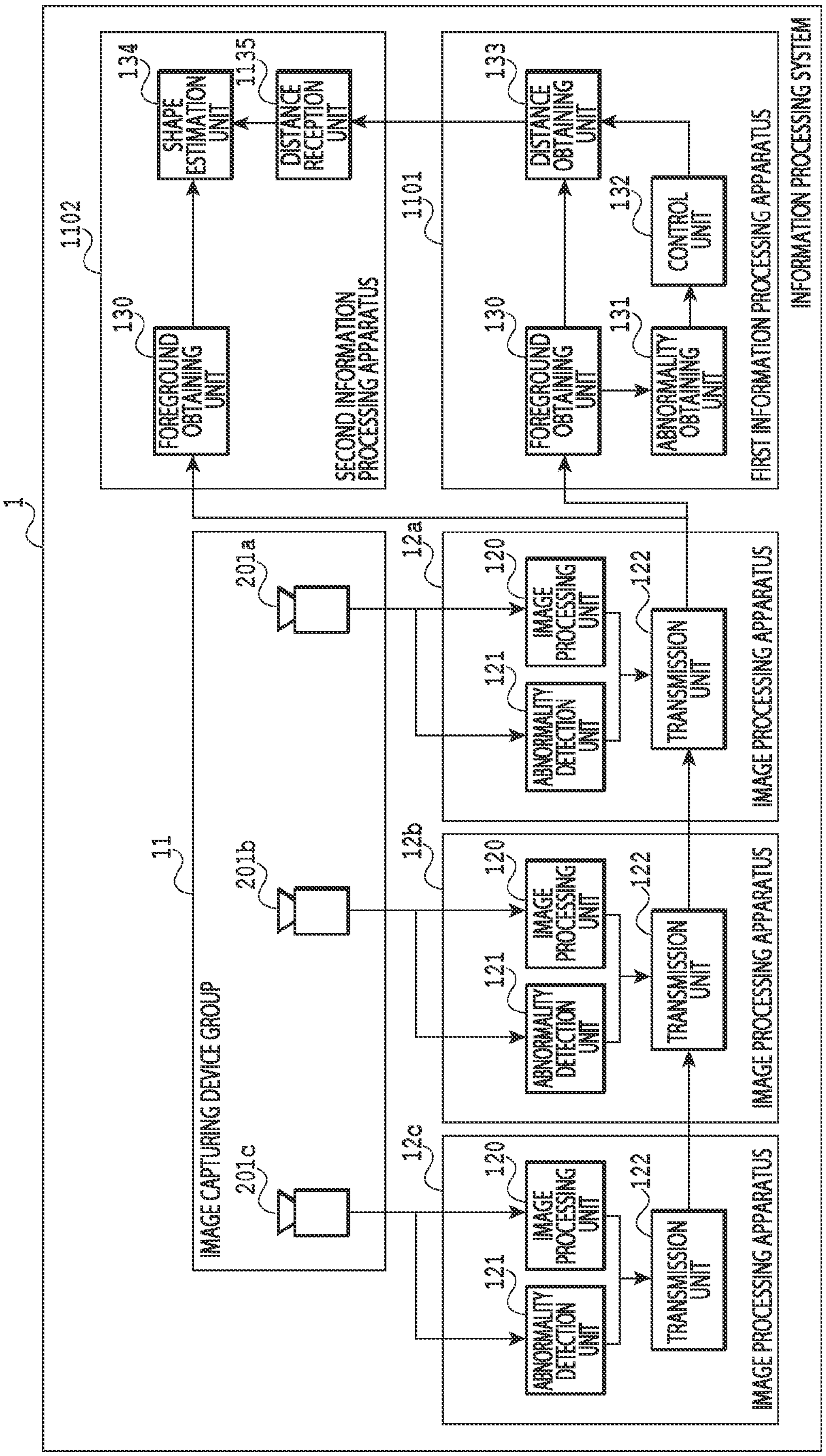
FIG. 11 is a block diagram illustrating an example of a configuration of an information processing system according to Embodiment 3.

FIG. 11 is a block diagram illustrating an example of a configuration of the information processing system 1 according to Embodiment 3 (hereinafter, simply referred to as "information processing system 1"). The information processing system 1 includes the image capturing device group 11, image processing apparatuses 12*a*, 12*b*, and 12*c*, a first information processing apparatus 1101, and a second information processing apparatus 1102. The image capturing device group 11 includes multiple image capturing devices 201. Explanation is given assuming that, as illustrated as an example in FIG. 11, the image capturing device group 11 according to the present embodiment includes three image capturing devices 201*a*, 201*b*, and 201*c*. The image capturing devices 201*a*, 201*b* and 201*c* are devices capable of operating as one or more sets of stereo cameras that enable estimation the distance information based on principles of stereovision. The image capturing devices 201*a*, 201*b*, and 201*c* are connected to the corresponding image processing apparatuses 12*a*, 12*b*, and 12*c*, respectively.

The image processing apparatus 12*a* to the image processing apparatus 12*c* are connected in cascade, and the foreground information generated by the image processing apparatus 12*c* and the image processing apparatus 12*b* is transmitted to the image processing apparatus 12*a*. The image processing apparatuses 12*a*, 12*b*, and 12*c* each include the image processing unit 120, the abnormality detection unit 121, and the transmission unit 122. Processing of the image processing unit 120 and the abnormality detection unit 121 in each of the image processing apparatuses 12*a*, 12*b*, and 12*c* is similar to the processing of the image processing unit 120 and the abnormality detection unit 121 in the image processing apparatus 12 according to Embodiment 1. The transmission unit 122 in each of the image processing apparatuses 12*a*, 12*b*, and 12*c* is a unit in which a function of receiving the foreground information from the other one or two of the image processing apparatuses 12*a*, 12*b*, and 12*c* connected in cascade is added to the function of the transmission unit 122 in the image processing apparatus 12 according to Embodiment 1. The foreground information corresponding to the images captured by the respective image capturing devices 201*a*, 201*b*, and 201*c* are transmitted to the first information processing apparatus 1101 and the second information processing apparatus 1102 via the image processing apparatus 12*a*. Hereinafter, the image processing apparatuses 12*a*, 12*b*, and 12*c* are collectively referred to as image processing apparatuses 12.

<Configuration of First Information Processing Apparatus>

The first information processing apparatus 1101 obtains the distance information, and transmits the obtained distance information to the second information processing apparatus 1102. The number of first information processing apparatuses 1101 included in the information processing system 1 is not limited to one, and the information processing system 1 may include multiple first information processing apparatuses 1101. For example, in the case where the image capturing device group 11 includes 30 image capturing devices 201 and up to six image processing apparatuses 12 can be connected in cascade, the information processing system 1 includes five or more first information processing apparatuses 1101. Note that, since the hardware configuration of the first information processing apparatus 1101 is similar to that of the information processing apparatus 100 according to Embodiment 1, explanation is omitted. The first information processing apparatus 1101 includes the foreground obtaining unit 130, the abnormality obtaining unit 131, the control unit 132, and the distance obtaining unit 133, and processing of each of the units included in the first information processing apparatus 1101 is similar to the processing of a corresponding unit in the information processing apparatus 100 according to Embodiment 1.

Specifically, the foreground obtaining unit 130 obtains the foreground information corresponding to the captured image data of the image capturing devices 201*a*, 201*b*, and 201*c*, from the series of image processing apparatuses 12 connected in cascade. Moreover, the foreground obtaining unit 130 obtains the image capturing parameters corresponding to the image capturing devices 201*a*, 201*b*, and 201*c* only once at, for example, the activation of the first information processing apparatus 1101. The obtained foreground information and image capturing parameters are transmitted to the distance obtaining unit 133. The abnormality obtaining unit 131 obtains the device abnormality information and the foreground abnormality information for the image capturing devices 201*a*, 201*b*, and 201*c* connected to the series of image processing apparatuses 12 connected in cascade. Moreover, in addition to the device abnormality information and the foreground abnormality information, the abnormality obtaining unit 131 detects occurrence of the transmission abnormality in transmission of the foreground information in the cascade connection, and generates the transmission abnormality information indicating the transmission abnormality based on the detection result. The device abnormality information, the foreground abnormality information, and the transmission abnormality information are transmitted to the control unit 132. The control unit 132 decides the stereo pairs to be used in the obtaining of the distance information based on these pieces of abnormality information, and generates the pair information indicating the decided stereo pairs. The pair information is transmitted to the distance obtaining unit 133.

A method of deciding the image capturing devices 201 to be used as the stereo pairs is explained with reference to FIG. 12. FIG. 12 is a diagram for explaining examples of the image capturing devices 201 decided as the stereo pairs according to Embodiment 3. In the case where the image capturing devices 201*a*, 201*b*, and 201*c* are arranged as illustrated in FIG. 11 as an example, information corresponding to the table illustrated in FIG. 12 is created in advance, and for example, the first information processing apparatus 1101 obtains this information only once at the activation of the first information processing apparatus 1101. Since the items in the table illustrated in FIG. 12 are similar to the items in the table illustrated in FIG. 6 and explained in Embodiment 1, explanation is omitted. The distance obtaining unit 133 obtains the distance information based on the stereo pairs decided by the control unit 132. Since a method of obtaining the distance information in the distance obtaining unit 133 of the first information processing apparatus 1101 is similar to the method of obtaining the distance information in the distance obtaining unit 133 of the information processing apparatus 100 according to Embodiment 1, explanation is omitted. The distance obtaining unit 133 transmits the distance information to the second information processing apparatus 1102.

<Configuration of Second Information Processing Apparatus>

The second information processing apparatus 1102 obtains the foreground information, the image capturing parameters, and the distance information, and estimates the three-dimensional shape of the object by using these pieces of information. Note that, since the hardware configuration of the second information processing apparatus 1102 is similar to the information processing apparatus 100 according to Embodiment 1, explanation is omitted. The second information processing apparatus 1102 includes the foreground obtaining unit 130, the shape estimation unit 134, and a distance reception unit 1135.

The foreground obtaining unit 130 of the second information processing apparatus 1102 obtains the foreground information corresponding to the captured image data of the image capturing devices 201*a*, 201*b*, and 201*c*, from the series of image processing apparatus 12 connected in cascade. Moreover, the foreground obtaining unit 130 of the second information processing apparatus 1102 obtains the image capturing parameters corresponding to the image capturing devices 201*a*, 201*b* and 201*c* only once, for example, at activation of the second information processing apparatus 1102. The foreground obtaining unit 130 of the second information processing apparatus 1102 is similar to the foreground obtaining unit 130 of the first information processing apparatus 1101. These pieces of information obtained by the foreground obtaining unit 130 of the second information processing apparatus 1102 is transmitted to the shape estimation unit 134. The distance reception unit 1135 receives the distance information from the first information processing apparatus 1101, and transmits the distance information to the shape estimation unit 134. The shape estimation unit 134 generates the initial shape data, and corrects the initial shape data by using the distance information like the shape estimation unit 134 of the information processing apparatus 100 according to Embodiment 1.

In the information processing system 1 according to the present embodiment, the processing of obtaining the distance information and the processing of estimating the three-dimensional shape of the object are performed in a distributed manner in separate apparatuses. The information processing system 1 according to the present embodiment can thereby estimate the three-dimensional shape of the object at higher speed than the information processing apparatus 100 according to Embodiment 1.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to reduce the error in the object shape estimation even in the case where an abnormality occurs in the image capturing device or the range sensor.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-39940, filed Mar. 14, 2023 which is hereby incorporated by reference wherein in its entirety.

What is claimed is:

1. An information processing apparatus comprising:

one or more hardware processors; and one or more memories storing one or more programs configured to be executed by the one or more hardware processors, the one or more programs including instructions for:

obtaining foreground information indicating a region corresponding to a foreground object in each of captured images obtained by causing a plurality of image capturing devices to perform image capturing, respectively, the plurality of image capturing devices configured to capture images of an image capturing region from directions varying from one another;

obtaining distance information indicating a distance from a reference point to the foreground object;

obtaining three-dimensional shape data indicating a three-dimensional shape of the foreground object based on the foreground information and the distance information, wherein in the case where the distance information is unobtainable by a first obtaining method, the distance information is obtained by a second obtaining method, and wherein at least one of the first obtaining method and the second obtaining method uses at least part of the plurality of image capturing devices as a stereo camera to obtain the distance information; and deciding the second obtaining method such that a region in which the distance information is unobtainable is reduced, in the case where the distance information is unobtainable by the first obtaining method, wherein in the case where the distance information is unobtainable by the first obtaining method, the distance information is obtained by the second obtaining method decided, wherein the distance information is a distance image, and obtaining the three-dimensional shape data includes a correction process that converts a point constituting the three-dimensional shape data into an imaging coordinate system corresponding to the reference point to obtain a distance of the point, compares the obtained distance with a distance value of a projected pixel corresponding to the point in the distance image, and deletes or adds the point based on a mismatch between the distances.

2. The information processing apparatus according to claim 1, wherein the first obtaining method includes a method of obtaining the distance information by using at least part of the plurality of image capturing devices as the stereo camera, and the distance information is obtained by the second obtaining method in the case where the distance information is unobtainable by the first obtaining method using the stereo camera.

3. The information processing apparatus according to claim 2, wherein the distance information is obtained by the second obtaining method in the case where the distance information is unobtainable by the first obtaining method using the stereo camera due to an abnormality in at least one of hardware in the image capturing devices used as the stereo camera, the foreground information corresponding to the captured images obtained by the image capturing of the image capturing devices used as the stereo camera, and transmission of the foreground information.

4. The information processing apparatus according to claim 3, wherein the second obtaining method is decided based on abnormality information indicating the abnormality.

5. The information processing apparatus according to claim 4, wherein the second obtaining method includes a method of obtaining the distance information by using at least part of the plurality of image capturing devices as the stereo camera, and the image capturing devices to be used as the stereo camera in the second obtaining method are decided from among the plurality of image capturing devices based on the abnormality information.

6. The information processing apparatus according to claim 4, wherein the second obtaining method includes a method of obtaining the distance information based on output from a range sensor, and the range sensor to be used in the second obtaining method is decided based on the abnormality information.

7. The information processing apparatus according to claim 1, wherein the first obtaining method includes a method of obtaining the distance information based on output from a range sensor, and the distance information is obtained by the second obtaining method in the case where the distance information is unobtainable by the first obtaining method using the range sensor.

8. The information processing apparatus according to claim 7, wherein the distance information is obtained by the second obtaining method in the case where the distance information is unobtainable by the first obtaining method using the range sensor due to a sensor abnormality in at least one of hardware in the range sensor used in the first obtaining method, the distance information based on the output from the range sensor, and transmission of the distance information.

9. The information processing apparatus according to claim 8, wherein the second obtaining method is decided based on sensor abnormality information indicating the sensor abnormality.

10. The information processing apparatus according to claim 9, wherein the second obtaining method includes a method of obtaining the distance information by using at least part of the plurality of image capturing devices as the stereo camera, and the image capturing devices to be used as the stereo camera in the second obtaining method is decided from among the plurality of image capturing devices based on the sensor abnormality information.

11. The information processing apparatus according to claim 6, wherein the range sensor is a sensor configured to measure a distance to an object by observing reflected light of emitted light.

12. The information processing apparatus according to claim 1, wherein the three-dimensional shape data is obtained by generating temporary three-dimensional shape data indicating the three-dimensional shape of the foreground object based on the foreground information and correcting the temporary three-dimensional shape data based on the distance information.

13. An information processing method comprising the steps of:

obtaining foreground information indicating a region corresponding to a foreground object in each of captured images obtained by causing a plurality of image capturing devices to perform image capturing, respectively, the plurality of image capturing devices configured to capture images of an image capturing region from directions varying from one another obtaining distance information indicating a distance from a reference point to the foreground object;

obtaining three-dimensional shape data indicating a three-dimensional shape of the foreground object based on the foreground information and the distance information, wherein in the case where the distance information is unobtainable by a first obtaining method, the distance information is obtained by a second obtaining method, and wherein at least one of the first obtaining method and the second obtaining method uses at least part of the plurality of image capturing devices as a stereo camera to obtain the distance information; and deciding the second obtaining method such that a region in which the distance information is unobtainable is reduced, in the case where the distance information is unobtainable by the first obtaining method, wherein in the case where the distance information is unobtainable by the first obtaining method, the distance information is obtained by the second obtaining method decided, wherein the distance information is a distance image, and obtaining the three-dimensional shape data includes a correction process that converts a point constituting the three-dimensional shape data into an imaging coordinate system corresponding to the reference point to obtain a distance of the point, compares the obtained distance with a distance value of a projected pixel corresponding to the point in the distance image, and deletes or adds the point based on a mismatch between the distances.

14. A non-transitory computer readable storage medium storing a program for causing a computer to perform a control method of an information processing apparatus, the control method comprising the steps of:

obtaining foreground information indicating a region corresponding to a foreground object in each of captured images obtained by causing a plurality of image capturing devices to perform image capturing, respectively, the plurality of image capturing devices configured to capture images of an image capturing region from directions varying from one another;

obtaining distance information indicating a distance from a reference point to the foreground object;

obtaining three-dimensional shape data indicating a three-dimensional shape of the foreground object based on the foreground information and the distance information, wherein in the case where the distance information is unobtainable by a first obtaining method, the distance information is obtained by a second obtaining method, and wherein at least one of the first obtaining method and the second obtaining method uses at least part of the plurality of image capturing devices as a stereo camera to obtain the distance information; and deciding the second obtaining method such that a region in which the distance information is unobtainable is reduced, in the case where the distance information is unobtainable by the first obtaining method, wherein in the case where the distance information is unobtainable by the first obtaining method, the distance information is obtained by the second obtaining method decided, wherein the distance information is a distance image, and obtaining the three-dimensional shape data includes a correction process that converts a point constituting the three-dimensional shape data into an imaging coordinate system corresponding to the reference point to obtain a distance of the point, compares the obtained distance with a distance value of a projected pixel corresponding to the point in the distance image, and deletes or adds the point based on a mismatch between the distances.

15. The information processing apparatus according to claim 1, wherein abnormality information for determining that the distance information is unobtainable is represented as a bit string having a bit corresponding to each of the plurality of image capturing devices, and a pair of image capturing devices to be used in the second obtaining method is selected based on a bit value of the bit string.

16. The information processing apparatus according to claim 1, wherein a stereo camera to be used in the second obtaining method is selected by a correspondence table stored in advance, and the correspondence table includes: a first image capturing device ID and a second image capturing device ID that identify a stereo pair; a group ID based on a degree of overlap of fields of view; and an identifier indicating an original of an alternative.

17. The information processing apparatus according to claim 1, wherein the reference point is an optical center of an image capturing device on a predetermined side among a pair of image capturing devices used as a stereo camera, and the correction process of the three-dimensional shape data is performed by comparing a distance obtained by projecting the three-dimensional shape data onto the image capturing device on the predetermined side with the distance information.

* * * * *